United States Patent
Tanaka

(10) Patent No.: US 9,941,975 B2
(45) Date of Patent: Apr. 10, 2018

(54) WAVELENGTH DIVISION MULTIPLEXING OPTICAL RECEIVER AND DRIVING METHOD FOR SAME

(71) Applicants: FUJITSU LIMITED, Kawasaki-shi, Kanagawa (JP); Photonics Electronics Technology Research Association, Bunkyo-ku, Tokyo (JP)

(72) Inventor: Shinsuke Tanaka, Hiratsuka (JP)

(73) Assignees: FUJITSU LIMITED, Kawasaki (JP); PHOTONICS ELECTRONICS TECHNOLOGY RESEARCH ASSOCIATION, Tokyo (JP)

(*) Notice: Subject to any disclaimer, the term of this patent is extended or adjusted under 35 U.S.C. 154(b) by 0 days.

(21) Appl. No.: 15/444,532

(22) Filed: Feb. 28, 2017

(65) Prior Publication Data
US 2017/0279539 A1   Sep. 28, 2017

(30) Foreign Application Priority Data

Mar. 25, 2016   (JP) .................. 2016-061636

(51) Int. Cl.
*H04B 10/61*   (2013.01)
*G02B 6/124*   (2006.01)
(Continued)

(52) U.S. Cl.
CPC .......... *H04B 10/614* (2013.01); *G02B 6/124* (2013.01); *G02B 6/126* (2013.01); *G02B 6/305* (2013.01);
(Continued)

(58) Field of Classification Search
CPC .............. H04B 10/614; H04B 10/0795; H04B 10/616; G02B 6/124; G02B 6/126; G02B 6/305; H04J 14/02
See application file for complete search history.

(56) References Cited

U.S. PATENT DOCUMENTS

2009/0190926 A1* 7/2009 Charlet ................ H04B 10/532
                                                                398/74
2010/0316393 A1* 12/2010 Schmidt ................ H04B 10/61
                                                                398/205
(Continued)

FOREIGN PATENT DOCUMENTS

WO   2013/179467 A1   12/2013

*Primary Examiner* — Shi K Li
*Assistant Examiner* — Mina Shalaby
(74) *Attorney, Agent, or Firm* — Kratz, Quintos and Hanson, LLP

(57) ABSTRACT

The invention relates to a wavelength division multiplexing optical receiver that is provided with a polarization splitting grating coupler and a driving method for the same, where the power consumption is reduced, and at the same time, a degradation in the receiver sensitivity is suppressed. Two monitor photodetectors configured to monitor the light intensity of a first polarization component and a second polarization component separated by a polarization splitting optical coupler are provided, and a control circuit is provided in order to allow a semiconductor optical amplifier that amplifies the first polarization component and another semiconductor optical amplifier that amplifies the second polarization component in accordance with the signal intensity ratio of the two monitor photodetectors to amplify light with different light gains.

13 Claims, 16 Drawing Sheets

(51) Int. Cl.
*G02B 6/126* (2006.01)
*G02B 6/30* (2006.01)
*H04B 10/079* (2013.01)
*H04J 14/02* (2006.01)

(52) U.S. Cl.
CPC ....... *H04B 10/0795* (2013.01); *H04B 10/616* (2013.01); *H04J 14/02* (2013.01)

(56) References Cited

U.S. PATENT DOCUMENTS

2015/0050020 A1 2/2015 Tanaka
2015/0117872 A1* 4/2015 Lyubomirsky .......... H04J 14/06
398/205

* cited by examiner

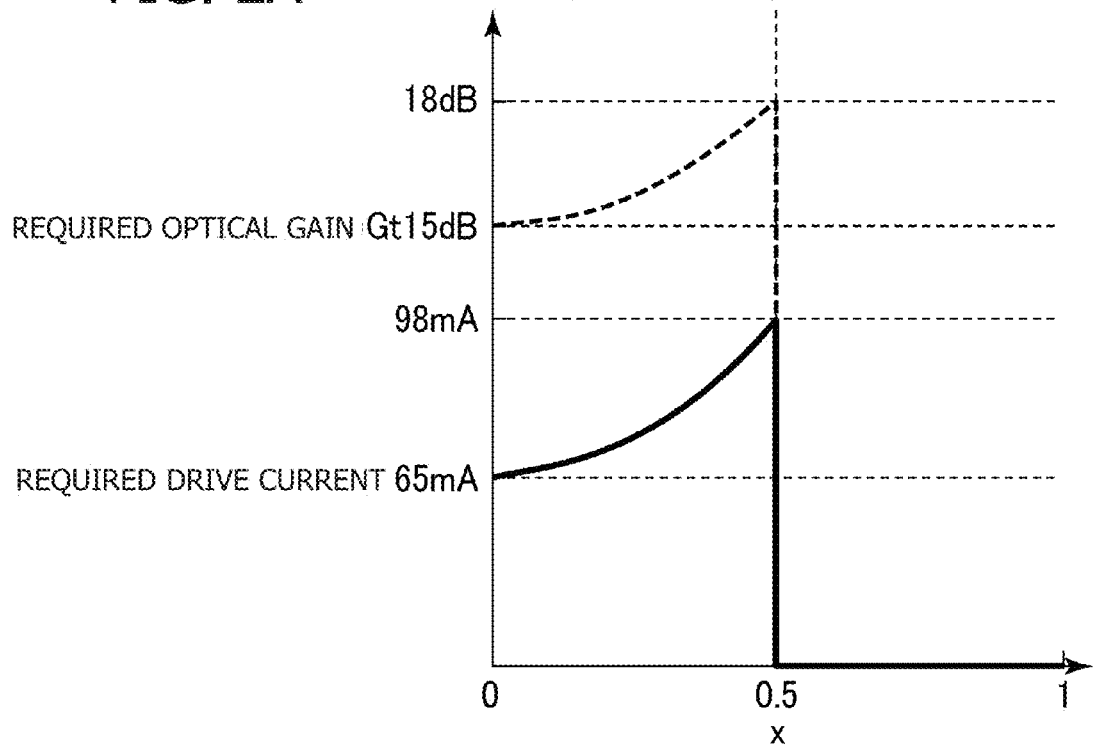
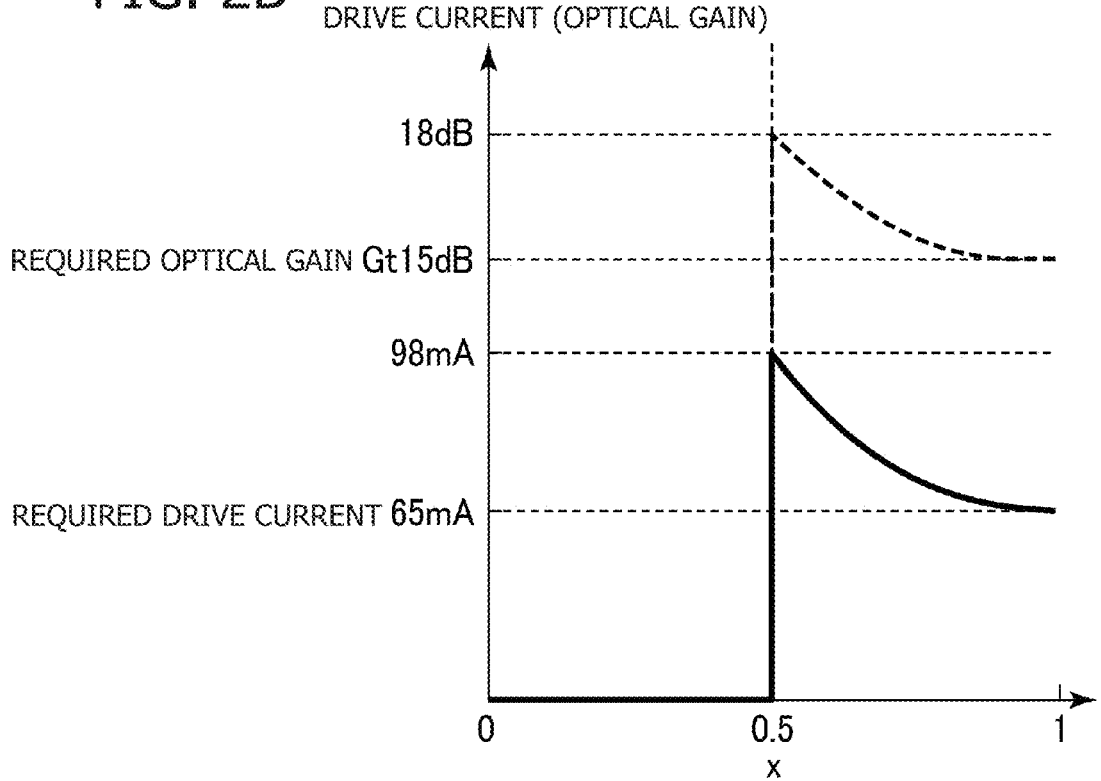

WAVELENGTH DIVISION MULTIPLEXING OPTICAL RECEIVER AND DRIVING METHOD FOR SAME

CROSS-REFERENCE TO RELATED APPLICATION

This application is based upon and claims the benefit of priority of the prior Japanese Patent Application No. 2016-061636, filed on Mar. 25, 2016, the entire contents of which are incorporated herein by reference.

FIELD

The present invention relates to a wavelength division multiplexing optical receiver and a driving method for the same, and for example, to a wavelength division multiplexing optical receiver of which the application is expected to vary, such as a high-end server and an optical I/O element for interconnect between CPUs in a large-scale computing system, as well as a driving method for the same.

BACKGROUND

In recent years, photonic integrated elements fabricated on an inexpensive Si substrate having a large area have been attracting attention. Si is a medium that is transparent for optical signals in a 1.3 µm band or in a 1.55 µm band that have been used for conventional optical communication. Various types of optical elements based on a silicon photonic wire waveguide technology for high-level optical confinement with low loss using a high-level process technology have been proposed and demonstrated.

In order to increase the transmission capacity in a silicon photonic integrated circuit, a wavelength division multiplex (WDM) silicon photonic integrated circuit, to which a WDM transmission system used for optical fiber communication is applied and where a number of optical wavelength signals that have been independently modulated are multiplexed within a silicon device for transmission and detection, is regarded to be promising.

WDM signal light that has propagated through an optical fiber, which is a transmission path, is inputted into a light receiving device in a random polarization state where S polarized waves and P polarized waves are mixed, and therefore, the light receiving device is required to have such a configuration where wavelength demultiplexing and light detection can be performed at a constant efficiency irrelevant of the state of the polarization. Therefore, a polarization splitting grating coupler through which input light of the two types of polarization can be coupled with a silicon waveguide at high efficiency is used without using a particular fabrication process.

FIG. 16 is a schematic diagram illustrating the configuration of a conventional wavelength division multiplexing optical receiver, which is herein used for the description of an example where WDM signal light in which optical signals of four wavelengths are multiplexed is received so that the respective wavelength components are separated in a wavelength demultiplexer (DEMUX) within an element so as to be converted to electrical signals in different photodetectors. WDM signal light that has entered from an optical fiber 73 is separated into S polarized waves (x) and P polarized waves (1−x) by a polarization splitting grating coupler 61 so as to be outputted. The polarization splitting grating coupler 61 has the functions of coupling an S polarized wave component of which the electrical field is perpendicular to the entrance plane and a P polarized wave component of which the electrical field is parallel to the entrance plane of WDM signal light that has entered in the vertical direction with different Si photonic wire waveguides 62 and 63 as in a TE mode (waveguide mode where the electrical field is parallel to the Si substrate) and outputting the resulting signal light.

Therefore, the output from the polarization splitting grating coupler 61 is separated into the respective wavelengths by a pair of wavelength demultiplexers 68 and 69 that correspond to the respective polarized wave components through the Si photonic wire waveguides 62, 63, 66 and 67. The signal lights that have been separated for the respective wavelengths are received by a photodiode array 72 where bidirectional input type photodiodes $72_1$ through $72_4$ are in an array through Si photonic wire waveguides $70_1$ through $71_4$, and as a result of this, a so-called polarization diversity configuration is adopted.

This configuration makes stable wavelength separation and light detection possible even when the state of the polarization of WDM signal light fluctuates within the optical fiber 73. Incidentally, in some cases, optical loss is large in the transmission path and within the integrated transmitter/receiver, and the intensity of light inputted into the photodetectors is insufficient in a large capacity WDM optical link to which the wavelength division multiplexing optical receiver 60 is applied. In such a case, it has been proposed that in order to collectively amplify WDM signal light, polarization dependent SOAs 64 and 65 should be arranged on the reception side as illustrated in FIG. 16 as a system for compensating loss with low power instead of excessively increasing the optical output of the laser that generates WDM signal light (see Patent Literature 1).

Patent Literature 1: International Publication Pamphlet No. WO2013/179467

SUMMARY

In the case where polarization dependent SOAs are applied to the wavelength division multiplexing optical receiver 60 where the polarization splitting grating coupler 61 in FIG. 16 is used, it is necessary to respectively arrange polarization dependent SOAs 64 and 65 in the output waveguides (62 and 63) of the polarization splitting grating coupler 61 due to the requirements for mounting. It is also necessary to provide the same drive current to the polarization dependent SOAs 64 and 65 that are arranged in the respective output waveguides (62 and 63) in order to provide an equal optical gain to both the S polarized light component and the P polarized light component which randomly fluctuate.

In order to achieve an optical gain of 15 dB, which is a required optical gain Gt in the polarization dependent SOAs 64 and 65, for example, it is necessary to provide 65 mA respectively to the polarization dependent SOAs 64 and 65. However, such a configuration has a problem where the required number of elements in the polarization dependent SOAs is doubled and the power consumed by the polarization dependent SOAs is doubled as compared to the case where polarization dependent SOAs are applied to the receivers in the non-polarization diversity system illustrated in Patent Literature 1. Furthermore, the amount of ASE (amplified spontaneous emission) light from the polarization dependent SOAs 64 and 65 that enters into the photodiodes $72_1$ through $72_4$ is also doubled, and therefore, there is a demerit in that the optical signal-noise intensity rate (OSNR) lowers by 3 dB.

As described above, various problems such as an increase in the cost (the number of SOA elements), an increase in the power consumption (power for driving SOAs), and a reduction in the receiver sensitivity (lowering of OSNR) have arisen in the wavelength division multiplexing optical receiver having the polarization diversity configuration as illustrated in FIG. 16.

A wavelength division multiplexing optical receiver, including:
  a polarization splitting optical coupler configured to separate wavelength division multiplexing signal light into respective polarization components;
  a first semiconductor optical amplifier configured to amplify a first polarization component that has been separated by the polarization splitting optical coupler;
  a second semiconductor optical amplifier configured to amplify a second polarization component that has been separated by the polarization splitting optical coupler;
  a wavelength demultiplexer configured to demultiplex the outputs from the first semiconductor optical amplifier and the second semiconductor optical amplifier into respective wavelengths;
  a photodetector configured to detect the outputs of the wavelength demultiplexer for the respective wavelengths;
  a first monitor photodetector configured to monitor the light intensity of the first polarization component in the front stage of the first semiconductor optical amplifier;
  a second monitor photodetector configured to monitor the light intensity of the second polarization component in the front stage of the second semiconductor optical amplifier; and
  a control circuit configured to optically amplify the first semiconductor optical amplifier and the second semiconductor optical amplifier with different optical gains in accordance with the intensity ratio of the output from the first monitor photodetector to the output of the second monitor photodetector.

In accordance with another embodiment, a driving method for a wavelength division multiplexing optical receiver is provided with the steps of: comparing a first monitor output resulting from the monitoring of the light intensity of a first polarization component separated by a polarization splitting optical coupler configured to separate wavelength division multiplexing signal light into respective polarization components to a second monitor output resulting from the monitoring of a second polarization component separated by the above-described polarization splitting optical coupler so that a first semiconductor optical amplifier configured to amplify the first polarization component and a second semiconductor amplifier configured to amplify the second polarization component can amplify light with different optical gains in response to the intensity ratio of the first monitor output to the second monitor output; and allowing photodetectors to detect the above-described optically amplified wavelength division multiplexing signal light for the respective wavelengths after the light has been separated into the respective wavelengths.

According to one aspect of the invention, it becomes possible to reduce the power consumption, and at the same time, to suppress the reduction in the receiver sensitivity.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIGS. 2A and 2B are graphs illustrating the semiconductor amplifier drive current in the embodiment of the present invention.

DESCRIPTION OF EMBODIMENTS

Figure 1:
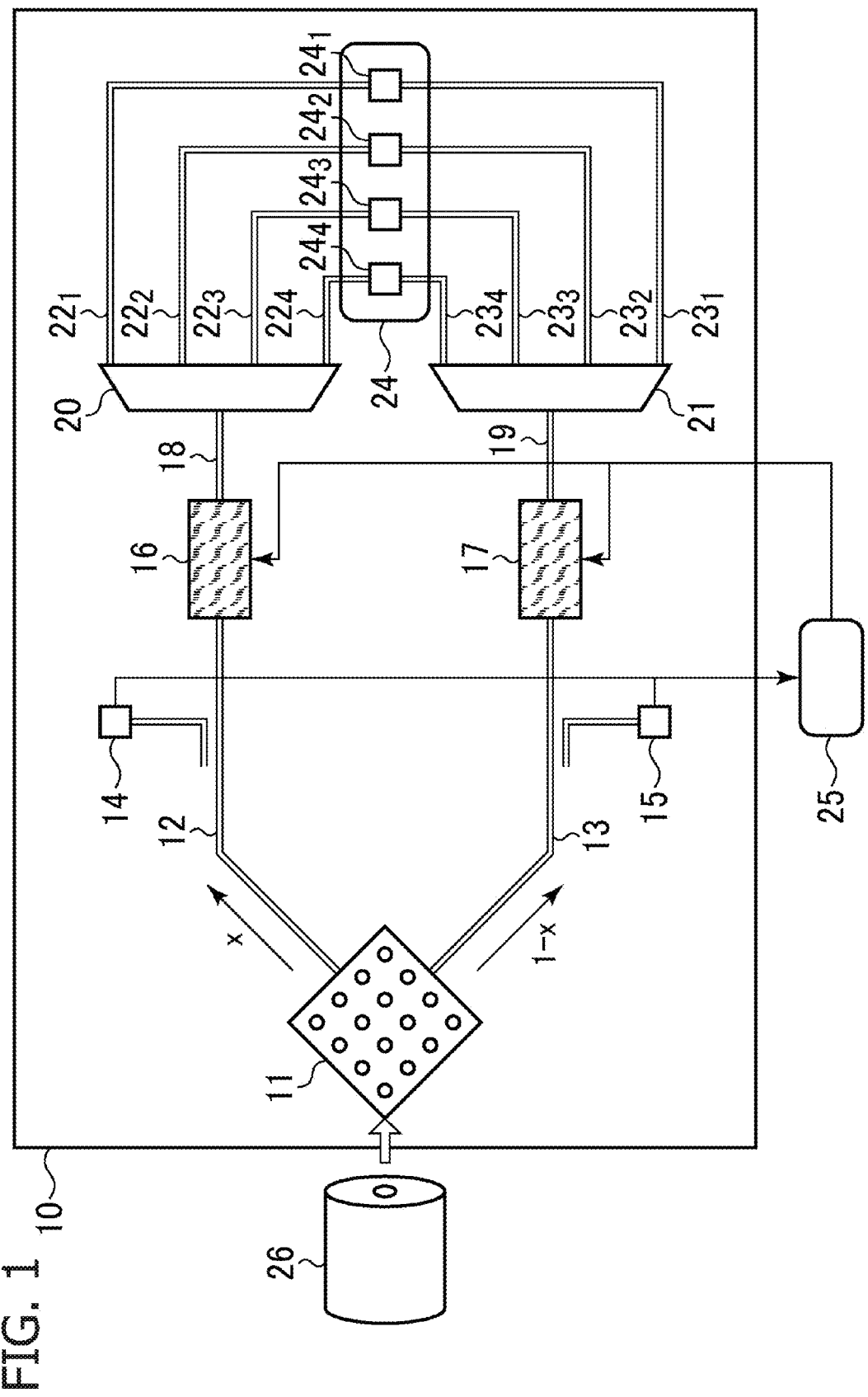
FIG. 1 is a schematic diagram illustrating the configuration of the wavelength division multiplexing optical receiver according to the embodiment of the present invention.

In reference to FIGS. 1 through 2B, the wavelength division multiplexing optical receiver and the driving method for the same according to an embodiment of the present invention are described. FIG. 1 is a schematic diagram illustrating the configuration of the wavelength division multiplexing optical receiver according to the embodiment of the present invention, which is provided with: a first semiconductor optical amplifier 16 that can amplify one polarized wave component that has been separated by a polarization splitting optical coupler 11 that can separate wavelength division multiplexing signal light into the respective polarized wave components; and a second semiconductor optical amplifier 17 that can amplify the other polarized wave component. Wavelength demultiplexers 20 and 21 that can separate the outputs of the first semiconductor optical amplifier 16 and the second semiconductor optical amplifier 17 into the respective wavelengths are also provided, and a photodetector 24 that can detect the outputs from the wavelength demultiplexers 20 and 21 for each wavelength is provided. Here, it is desirable to use polarization dependent semiconductor optical amplifiers which have higher performance and of which the cost is lower and use less power as compared to a polarization independent semiconductor optical amplifier for the first semiconductor optical amplifier 16 and the second semiconductor optical amplifier 17. Here, a polarization splitting grating coupler may be used for the polarization splitting optical coupler 11. Alternatively, the polarization splitting optical coupler 11 may be formed of: a spot size converter; a polarization separator that can separate wavelength division multiplexing signal light from the above-described spot size converter into an S polarized light component that propagates in a TE mode and a P polarized light component that propagates in a TM mode; and a polarization rotator that can convert the P polarized light component that has been separated by the above-described polarization separator and propagates in a TM mode into a TE mode.

In the embodiment of the present invention, a first monitor photodetector 14 that monitors the light intensity (x) of one polarized wave component is provided in the front stage of the first semiconductor optical amplifier 16, and a second monitor photodetector 15 that monitors the light intensity (1−x) of the other polarized wave component is provided in the front stage of the second semiconductor optical amplifier 17. A control circuit 25 that can drive the first semiconductor optical amplifier 16 and the second semiconductor optical amplifier 17 with different optical gains in accordance with the intensity ratio of the output from the first monitor photodetector 14 to the output from the second monitor photodetector 15 is provided. Here, 12, 13, 18, 19 and $22_1$ through $23_4$ in the figure are optical waveguides such as Si photonic wire waveguides. In addition, $24_1$ through $24_4$ and 26 in the figure are light detecting devices and an optical fiber. Here, a control circuit 25 may have a function of controlling a drive current to be injected into the first semiconductor optical amplifier 16 and the second semiconductor optical amplifier 17 so that the intensity of light received by the photodetector 24 becomes constant as seen from the output of the photodetector 24 that detects the output of the wavelength demultiplexers 20 and 21 for each wavelength.

The wavelength demultiplexers may include a first wavelength demultiplexer 20 that can separate the output of the first semiconductor optical amplifier 16 into the respective wavelengths and a second wavelength demultiplexer 21 that can separate the output of the second semiconductor optical amplifier 17. In this case, a bidirectional input type photodetector may be used for the photodetector 24 so that the separated wavelengths can be detected collectively.

A multiplexer that can multiplex the outputs from the first semiconductor optical amplifier 16 and the second semiconductor optical amplifier 17 into a single optical waveguide may be provided between the wavelength demultiplexers and the first semiconductor optical amplifier 16 and the second semiconductor optical amplifier 17. In this case, the multiplexed wavelength division multiplexing signal light may be separated into the wavelengths by a single wavelength demultiplexer instead of the two wavelength demultiplexers. Here, a 2×1 type wavelength division multiplexing interferometer or a Y-branch waveguide may be used as the multiplexer.

Two discrete semiconductor optical amplifiers may be used as the first semiconductor optical amplifier 16 and the second semiconductor optical amplifier 17, or a semiconductor optical amplifier array where the first semiconductor optical amplifier 16 and the second semiconductor optical amplifier 17 form an array on the same substrate may be used.

FIGS. 2A and 2B are graphs illustrating the semiconductor amplifier drive current in the embodiment of the present invention. FIG. 2A is a graph illustrating the drive current and the optical gain of the second semiconductor optical amplifier 17, and FIG. 2B is a graph illustrating the drive current and the optical gain of the first semiconductor optical amplifier 16. The first monitor output resulting from the monitoring of the light intensity of one polarized wave component that has been separated by the polarization splitting optical coupler and the second monitor output resulting from the monitoring of the other polarized wave component are compared so that light is amplified by the first semiconductor optical amplifier and the second semiconductor optical amplifier with different optical gains in accordance with the intensity ratio of the two.

Here, such an example is cited that a current is injected into only one of the first semiconductor optical amplifier 16 or the second semiconductor optical amplifier 17 in accordance with the intensity ratio of the first monitor output to the second monitor output so as to provide optical gains. At this time, the drive current is controlled in accordance with the monitor outputs so that one semiconductor optical amplifier gains the required optical gain Gt or greater, and thus, the total optical gain provided before the wavelength division multiplexing signal light is inputted into the photodetectors after being separated into the respective wavelengths irrelevant of the state of the polarization is made constant through control. In the case of the graphs, the required optical gain Gt is 15 dB, and the drive current required for that is 65 mA.

Figure 16:
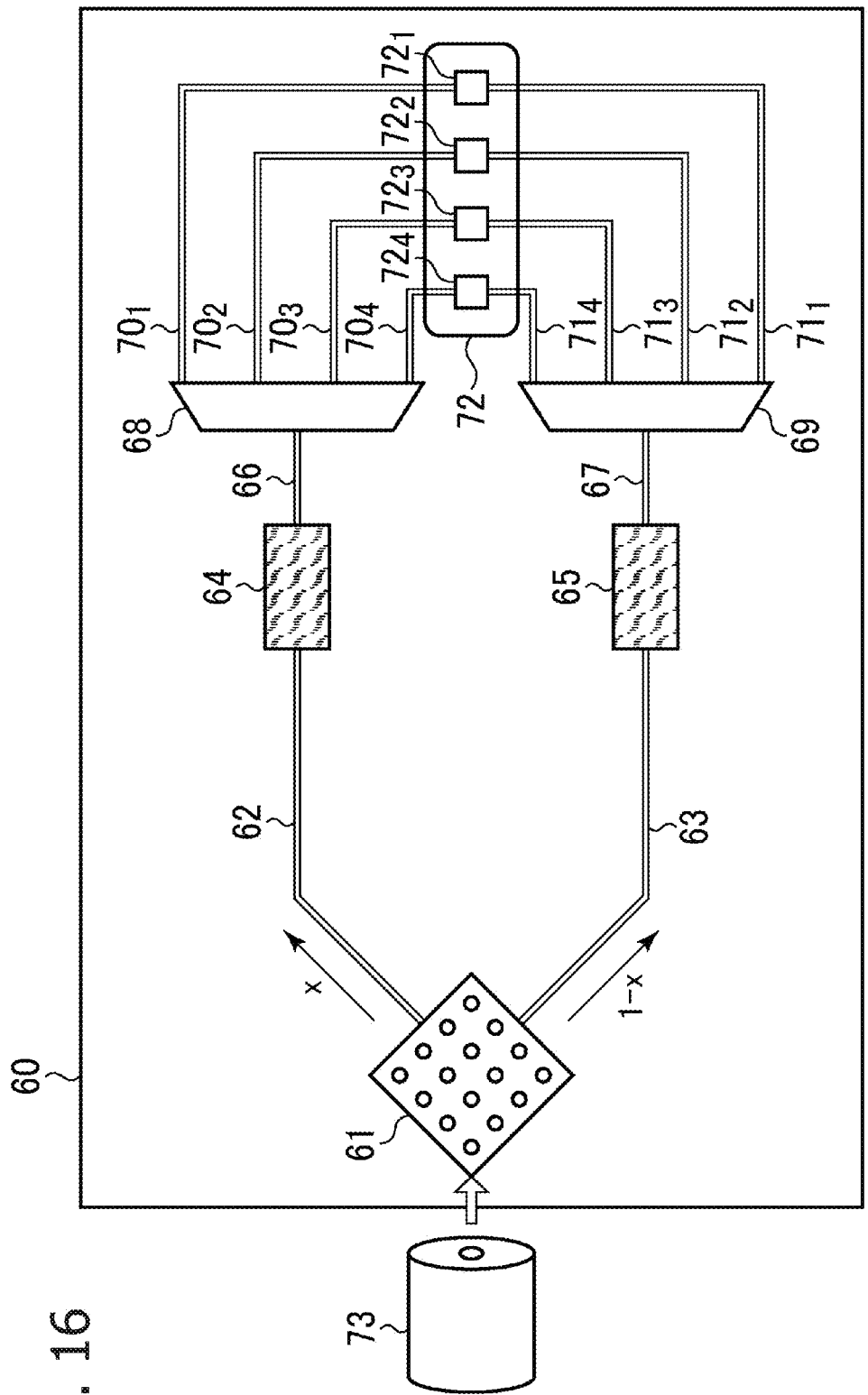
FIG. 16 is a schematic diagram illustrating the configuration of a conventional wavelength division multiplexing optical receiver.

In the conventional system illustrated in FIG. 16, the semiconductor optical amplifiers for P/S polarization are both driven so that the gain becomes the target gain Gt irrelevant of x, and therefore, power consumption is required for the two semiconductor optical amplifiers that are driven so that the optical gain always becomes Gt. In the embodiment of the present invention, however, power consumption is required for only one semiconductor optical amplifier that is driven so that the optical gain becomes Gt in the case of x=0 or 1, and therefore, it is possible to reduce the driving power to one-half of that of the conventional system. In addition, the power consumption of the semiconductor optical amplifiers increases due to an increase in the required gain as x approaches 0.5. Even in the case of x=0.5, however, the power consumption required to gain the optical gain of Gt+3 dB is smaller than that for the two semiconductor optical amplifiers that are driven for Gt, and therefore, a reduction in the power consumption can be achieved.

Alternatively, in the case where the intensity ratio of the first monitor output to the second monitor output is within a preset range, currents are injected into and from the first semiconductor optical amplifier 16 and the second semiconductor optical amplifier 17 mutually in a symmetric manner so that optical gains that are symmetric to each other are provided. In the case where the intensity ratio of the first monitor output to the second monitor output is out of the preset range, a current may be injected into only one of the first semiconductor optical amplifier 16 or the second semiconductor optical amplifier 17 so that an optical gain is provided.

In this case, a sudden switching operation between the first semiconductor optical amplifier 16 and the second semiconductor optical amplifier 17 that can be seen at x=0.5 in FIG. 2 can be avoided. As a result, the drive currents for the semiconductor optical amplifiers can be continuously adjusted at small increments over the entire region of the intensity ratio x, and therefore, an interruption in the optical signal or an optical surge caused by a delay in the rising/falling of the gain at the time when the drive current is updated (usually in the order of nsec) can be avoided so that a stable receiver operation can be achieved.

In addition, the output detected by the photodetector 24 may be fed back to the control circuit 25, and thus, the drive current that is injected into the first semiconductor optical amplifier 16 and the second semiconductor optical amplifier 17 may be controlled so that the intensity of light received by the photodetector 24 becomes constant. In this case, stable optical amplification and reception can be achieved when the wavelength division multiplexing signal light fluctuates over time, not only in the state of the polarization, but also in the light intensity.

In the embodiment of the present invention, the semiconductor optical amplifiers arranged in the optical waveguides for the two polarized wave components are selectively driven in accordance with the intensity ratio between the polarized wave components, and therefore, it is possible to reduce the power consumption, and at the same time, to suppress the reduction in the receiver sensitivity.

EXAMPLE 1

Figure 3:
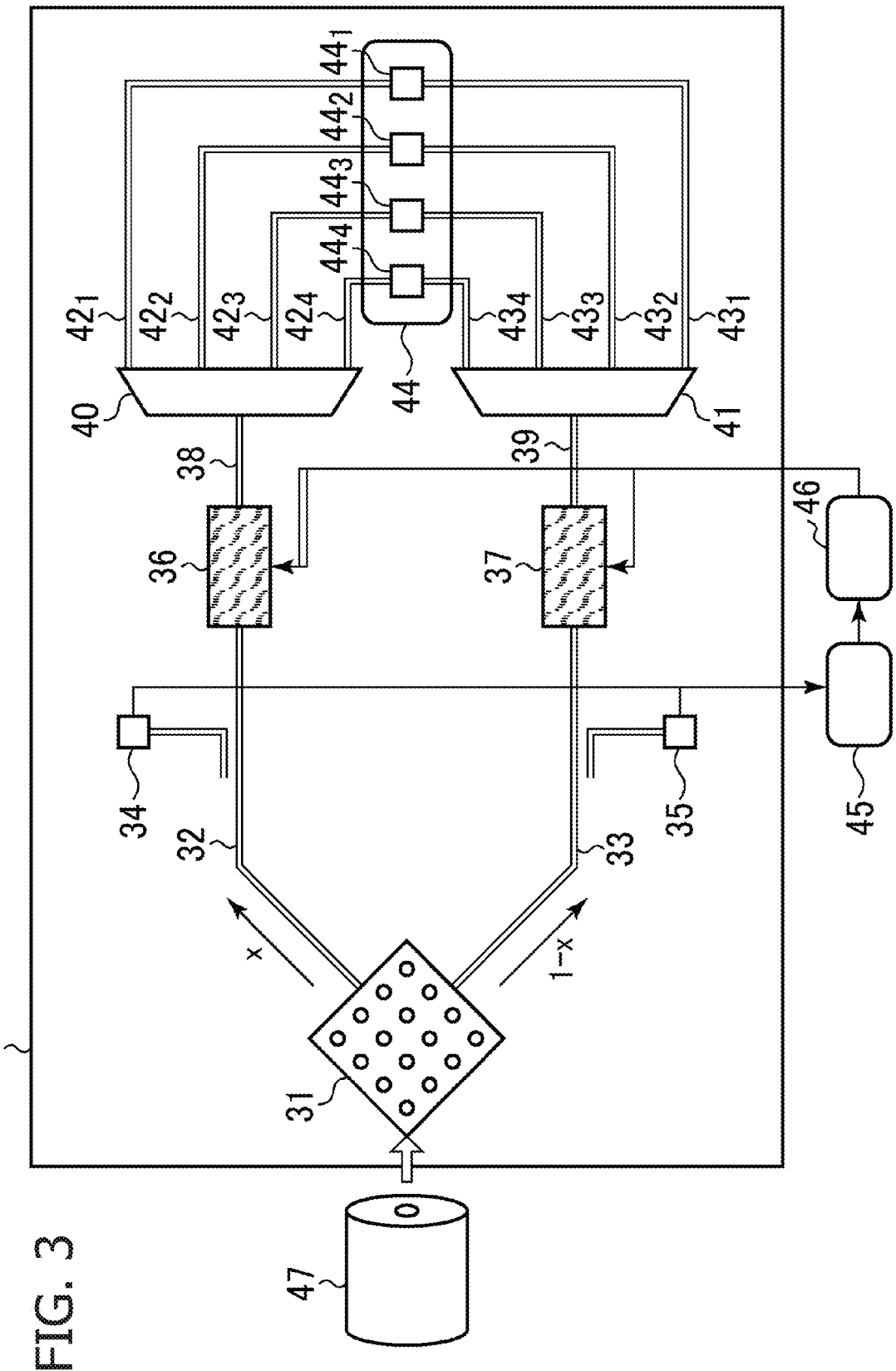
FIG. 3 is a schematic diagram illustrating the configuration of the wavelength division multiplexing optical receiver 30 according to Example 1 of the present invention.

Next, in reference to FIGS. 3 through 6B, the wavelength division multiplexing optical receiver and the driving method for the same according to Example 1 of the present invention are described, where a four-wavelength division multiplexing signal light is utilized. FIG. 3 is a schematic diagram illustrating the configuration of the wavelength division multiplexing optical receiver 30 according to Example 1 of the present invention, which is provided with a polarization dependent SOA 36 that can amplify the S polarized wave component that is separated by the polarization splitting grating coupler 31 for separating the wavelength multiplexing signal light that has entered through the optical fiber 47 into the respective polarized wave components, and a polarization dependent SOA 37 that can amplify the P polarized wave component. Wavelength demultiplexers 40 and 41 that can separate the outputs from the polarization dependent SOA 36 and the polarization dependent SOA 37 into the respective wavelengths are also provided, and a Ge photodiode array 44 that can detect the outputs from the wavelength demultiplexers 40 and 41 into the respective wavelengths is provided. The Ge photodiode array 44 is formed of bidirectional input type Ge photodiodes $44_1$ through $44_4$. The respective optical devices are connected to each other through Si photonic wire waveguides 32, 33, 38, 39 and $42_1$ through $43_4$. Here, the polarization dependent SOA 36 and the polarization dependent SOA 37 amplify only TE polarization.

In Example 1 of the present invention, a monitor PD 34 for monitoring the light intensity (x) of the S polarized wave component is provided in the front stage of the polarization dependent SOA 36, and a monitor PD 35 for monitoring the light intensity (1−x) of the P polarized wave component is provided in the front stage of the polarization dependent SOA 37. Tap type monitor PDs are used for the monitor PD 34 and the monitor PD 35.

The output of the monitor PD 34 and the output of the monitor PD 35 are inputted into a control circuit 45. The control circuit 45 controls an amplifier driving circuit 46 so that the polarization dependent SOA 36 and the polarization dependent SOA 37 can have different optical gains in accordance with the intensity ratio of the output of the monitor PD 34 to the output of the monitor PD 35. The drive current from the amplifier driving circuit 46 is injected into the polarization dependent SOA 36 and the polarization dependent SOA 37 so that only one polarization dependent SOA can be in operation all the time. Here, the driving circuit 45 and the amplifier driving circuit 46 are provided outside the wavelength division multiplexing optical receiver 30 formed by using a Si substrate. The polarization dependent SOA 36 and the polarization dependent SOA 37 are formed of a compound semiconductor in such a manner that a recess is provided in the Si substrate that forms the wavelength division multiplexing optical receiver 30, and the polarization dependent SOA 36 and the polarization dependent SOA 37 are mounted in this recess in accordance with a passive alignment method.

Figure 4:
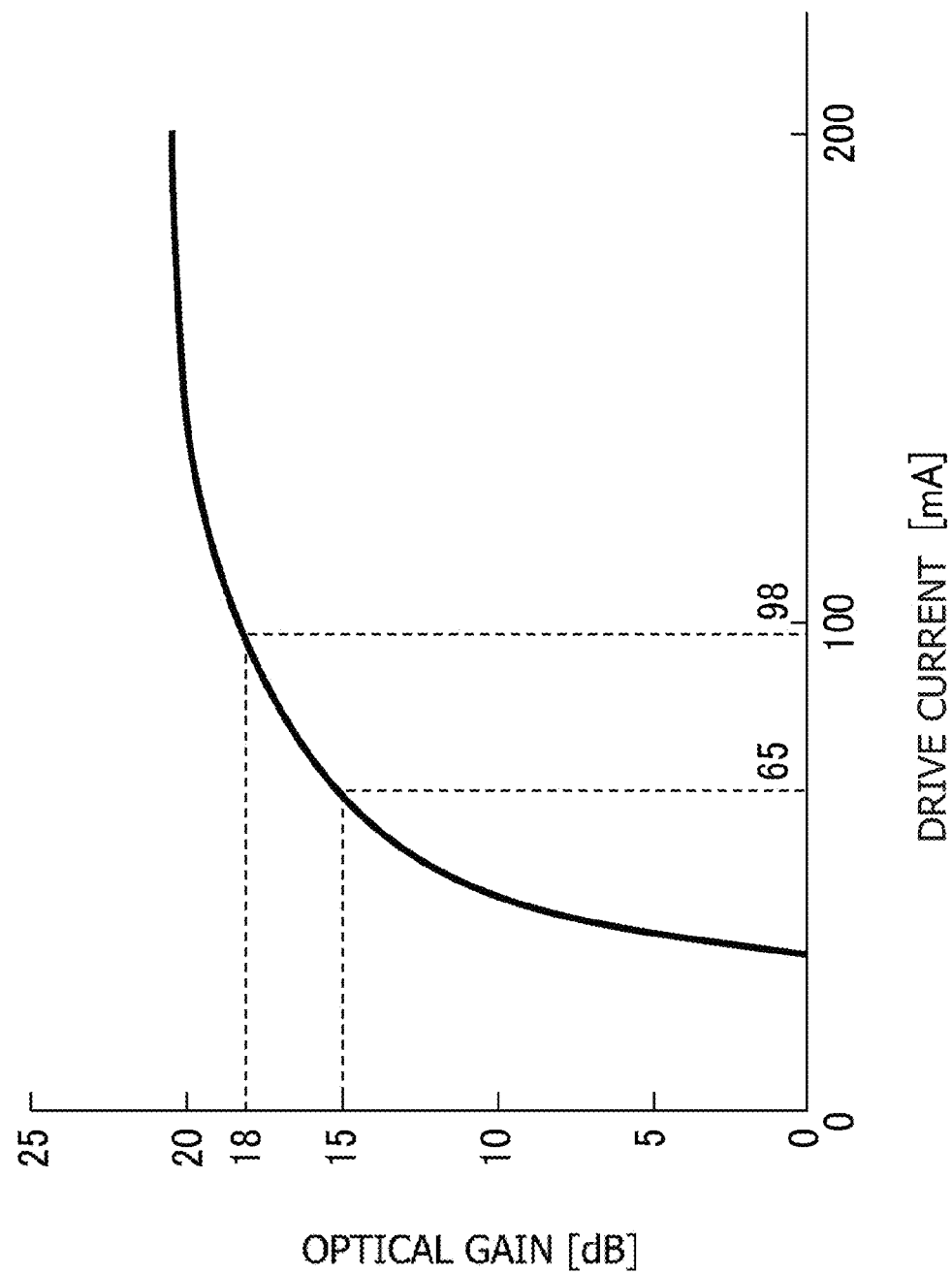
FIG. 4 is a graph illustrating the dependency of the optical gain of a semiconductor optical amplifier on the drive current

FIG. 4 is a graph illustrating the dependency of the optical gain of a semiconductor optical amplifier on the drive current, where a drive current is injected into a polarization dependent SOA so that the gain becomes the required gain Gt that is preset from the relationship between the intensity of the entered wavelength division multiplexing signal light and the minimum receiver sensitivity in the Ge photodiode. Here, the required gain Gt is 15 dB, and the drive current for this is 65 mA. The required gain increases as x increases, and the system is adjusted so that the optical gain is Gt+3 dB at x=0.5, and the drive current for this is 98 mA.

Figure 5A:
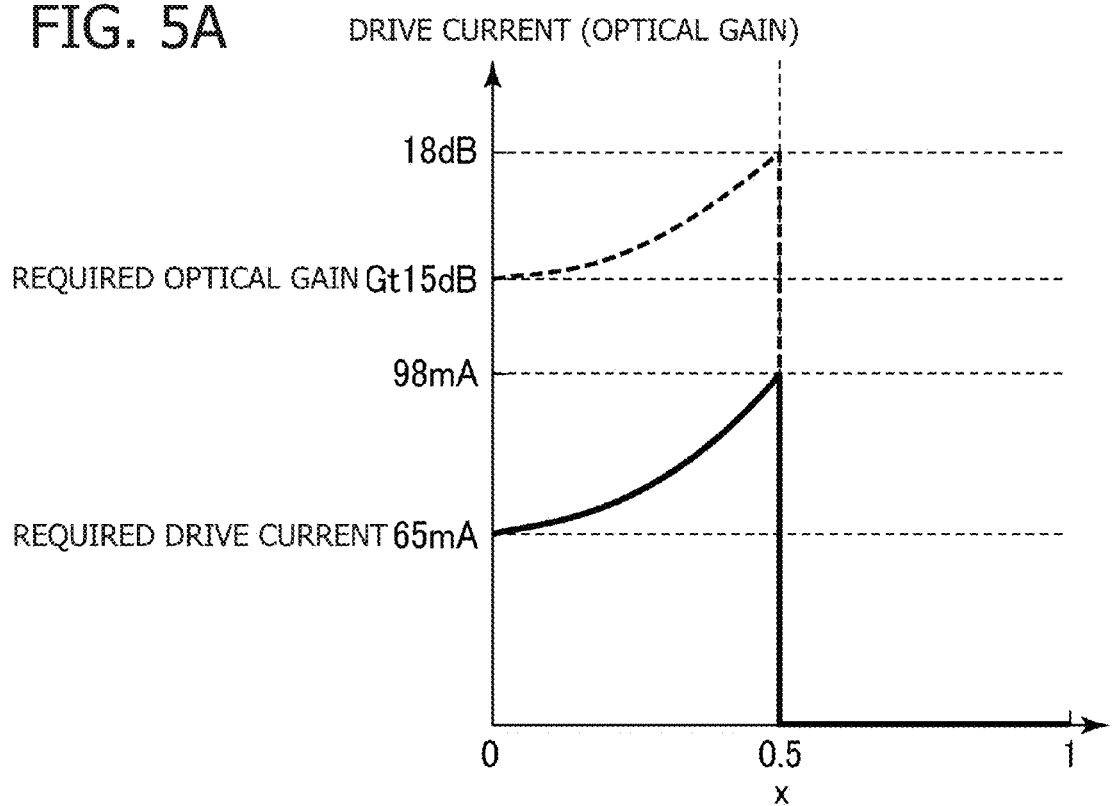
FIGS. 5A and 5B are graphs illustrating the semiconductor amplifier driving current in Example 1 of the present invention.
Figure 5B:
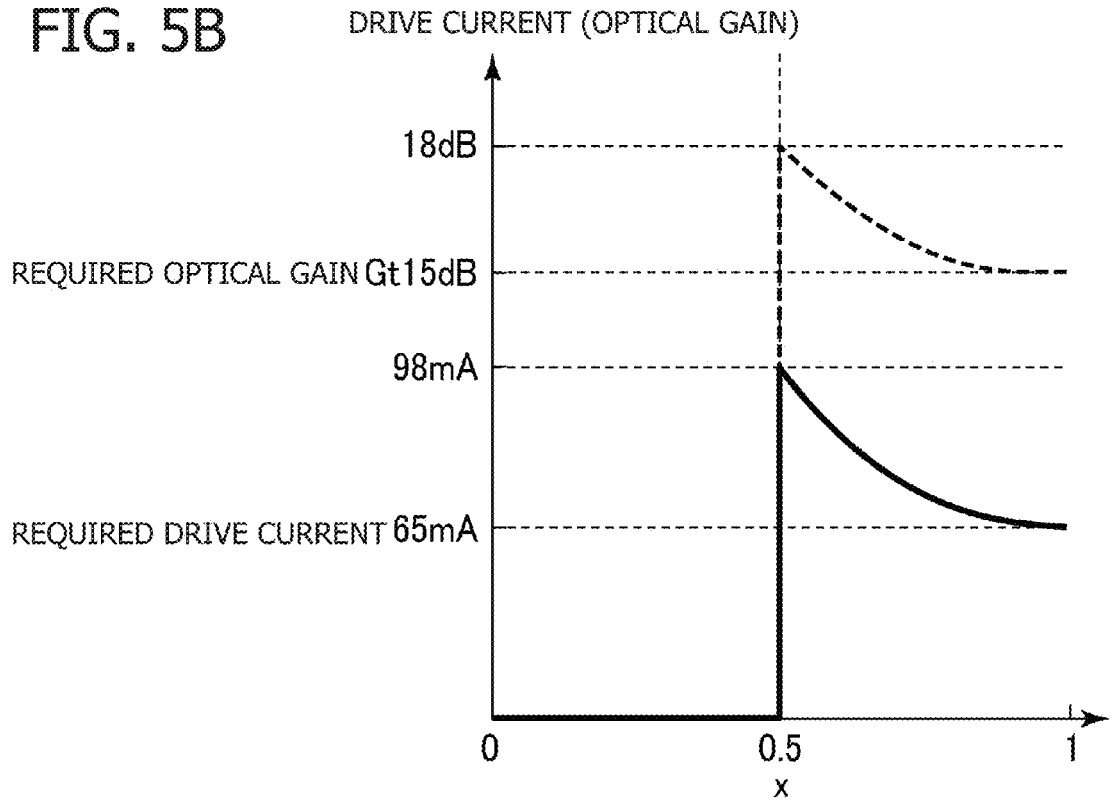

FIGS. 5A and 5B are graphs illustrating the semiconductor amplifier driving current in Example 1 of the present invention. FIG. 5A is a graph illustrating the relationship between the optical gain and the drive current for the polarization dependent SOA 37 that amplifies the P polarized wave component that is separated as a TE polarized wave. FIG. 5B is a graph illustrating the relationship between the optical gain and the drive current for the polarization dependent SOA 36 that amplifies the S polarized wave component that is separated as a TE polarized wave. In the case where it is found that the P polarized wave component is stronger (0<x<0.5) in accordance with the intensity ratio x or 1−x that has been detected by the monitor PDs 34 or 35 on the basis of the relationship between the optical gain and the drive current for the polarization dependent SOA in FIG. 4 that has been stored in the control circuit, only the polarization dependent SOA 37 is selectively driven. Meanwhile, in the case where the S polarized wave component is stronger (0.5<x<1), only the polarization dependent SOA 36 is selectively driven.

Here, the drive current for the optical gain G of the polarization dependent SOA in each case is determined from the required gain Gt of the wavelength division multiplexing optical receiver and the intensity rate x on the basis of the relationship between the optical gain and the drive current for the polarization dependent SOA that has been stored so that the intensity of the output light that has been selected and amplified is constant. That is to say, in the case where the polarization dependent SOA 37 for the P polarized wave amplification is driven, it is driven so that G=Gt−10×log(1−x) is achieved. In the case where the polarization dependent SOA 36 for the S polarized wave amplification is driven, it is driven so that G=Gt−10×log(x) is achieved.

As illustrated in FIGS. 5A and 5B, in the case where x is 0 (when the input signal light is completely a P polarized wave) or 1 (when the input signal light is completely an S polarized wave), the drive current and the optical gain of the polarization dependent SOA 36 or the polarization dependent SOA 37 that is driven become minimum. The drive current and the optical gain become maximum at x=0.5, and switching between the polarization dependent SOA 37 and the polarization dependent SOA 36 occurs. When x fluctuates in 0<x<1, an optical gain that is constant all the time is provided to the signal light, which is inputted into the Ge photodiode array 44. That is to say, a gain constant operation can be achieved. Here, this control for determining the drive current for the semiconductor optical amplifier is always repeated in a repetitive period (10 kHz, for example) that is sufficiently fast relative to the rate of fluctuation in the state of the polarized wave along the transmission path.

Figure 6A:
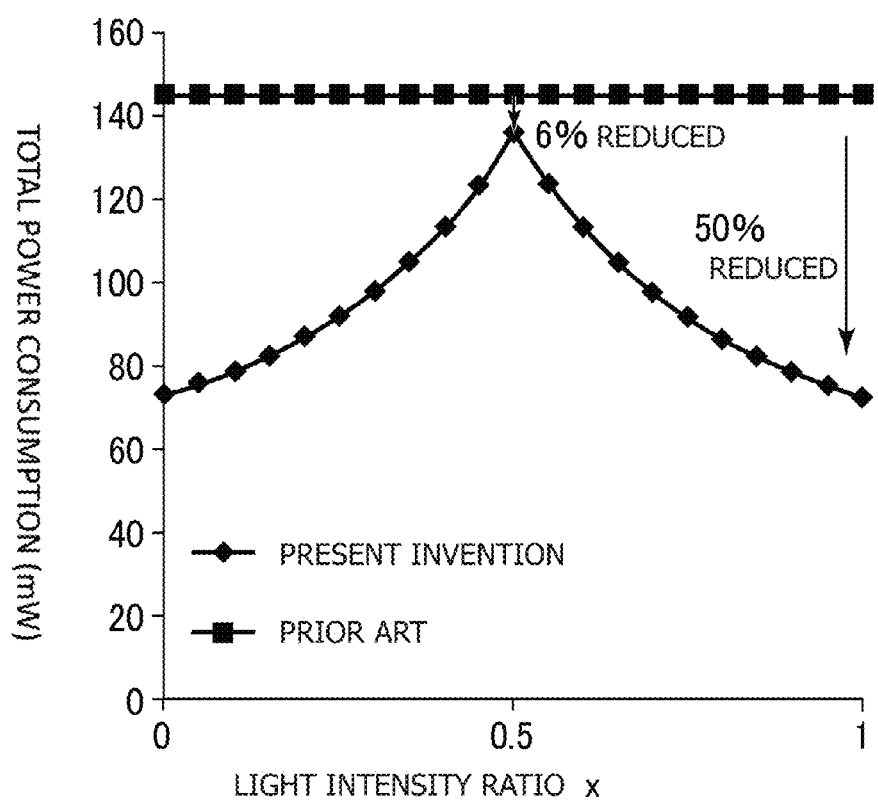
FIGS. 6A and 6B are graphs illustrating the working effects in Example 1 of the present invention.
Figure 6B:
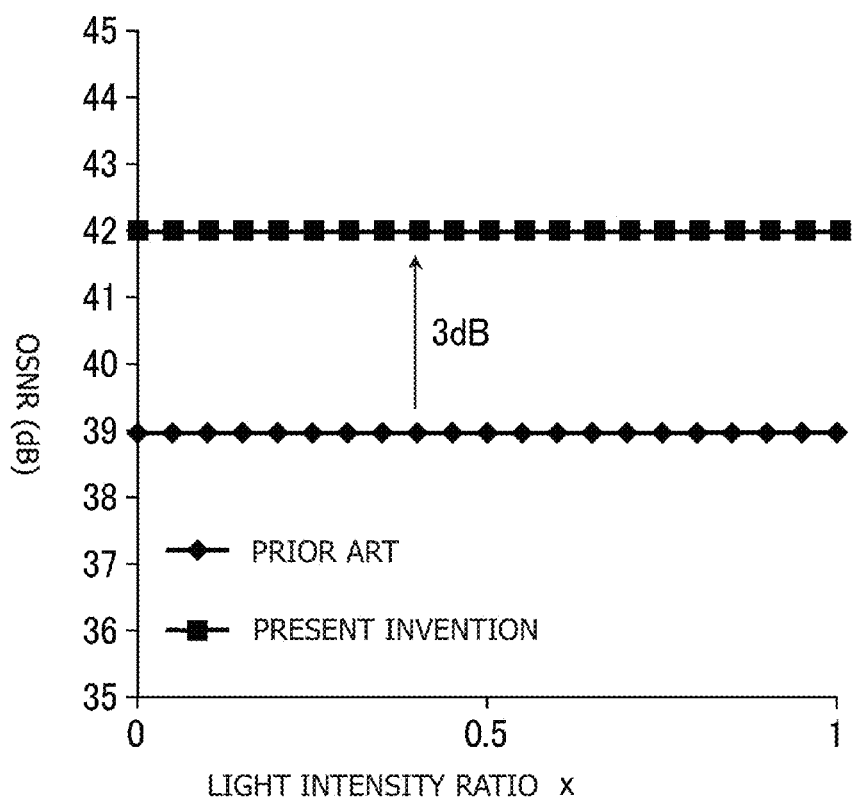

FIGS. 6A and 6B are graphs illustrating the working effects in Example 1 of the present invention. FIG. 6A is a graph illustrating the dependency of the total power consumption on the light intensity ratio x, and FIG. 6B is a graph illustrating the dependency of the optical signal-noise intensity rate (OSNR) on the optical intensity ratio x. As illustrated in FIG. 6B, in the case of the prior art, the two SOAs for P/S polarization are driven so that the target gain Gt is achieved irrelevant of x, and therefore, power consumption is required for the two SOAs that are driven so that the optical gain Gt is always achieved. Meanwhile, in Example 1 of the present invention, power consumption is required for one SOA that is driven for Gt in the case of x=0 or 1, and thus, the power consumption can be reduced to one-half the drive power for the prior art. In addition, the required gain increases, and thus, the power consumption of the SOAs increases as x approaches 0.5. In the case of x=0.5, however, the power consumption required for the SOAs in order to achieve the optical gain of Gt+3 dB is smaller than that for the two SOAs that are driven for Gt, and therefore, a reduction in the power consumption by approximately 6% can be achieved.

Taking the fact into consideration where the state of the polarization of the wavelength division multiplexing signal light that has been inputted at the time of actual use is random and x takes a value of 0<x<1 with an equal probability timewise, the effective power consumption in Example 1 of the present invention is reduced by approximately 35% from that of the conventional system.

As illustrated in FIG. 6B, two SOAs are always driven with a constant current in the prior art, and therefore, amplified spontaneous emission (ASE) noise for two SOAs is inputted into the Ge photodiode. In Example 1 of the present invention, however, one SOA that is either S or P is driven in accordance with the value of x, and therefore, only half of the ASE noise flows in, and thus, OSNR is improved by 3 dB. Though the gain of the SOA fluctuates through the control of the driving current in accordance with x, the NF of the SOA (the amount of deterioration of OSNR caused by the SOA) is constant within this range, and therefore, the OSNR does not fluctuate due to x.

In Example 1 of the present invention, only one SOA is driven, depending on the intensity ratio x of the separated S polarized wave component to the P polarized wave component, and therefore, it is possible to reduce the power consumption and suppress the degradation of the receiver sensitivity due to the deterioration of the OSNR.

EXAMPLE 2

Figure 7A:
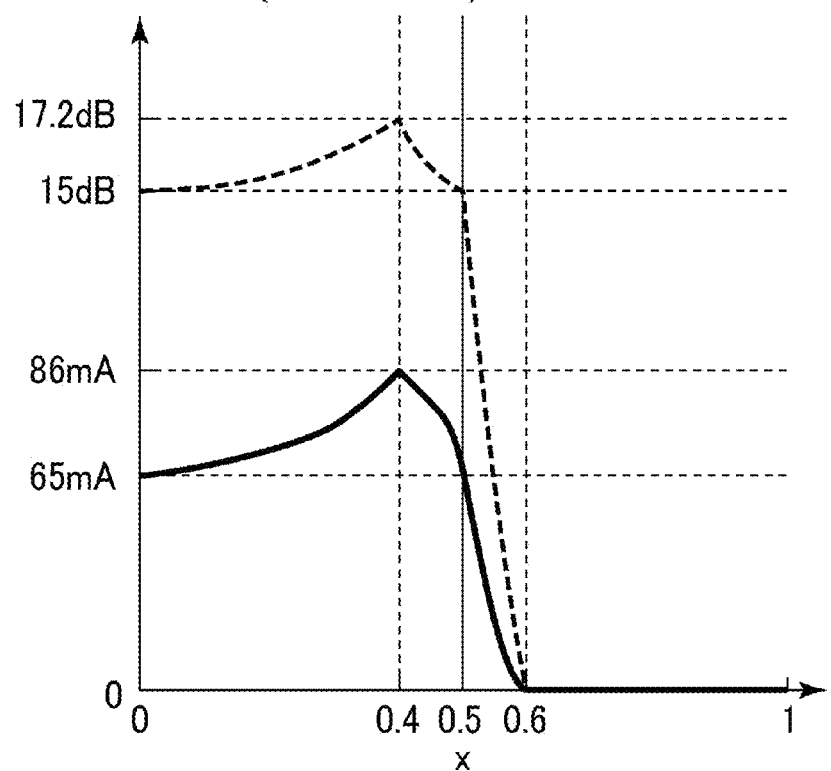
FIGS. 7A and 7B are graphs illustrating the driving current for the semiconductor amplifier in Example 2 of the present invention.
Figure 7B:
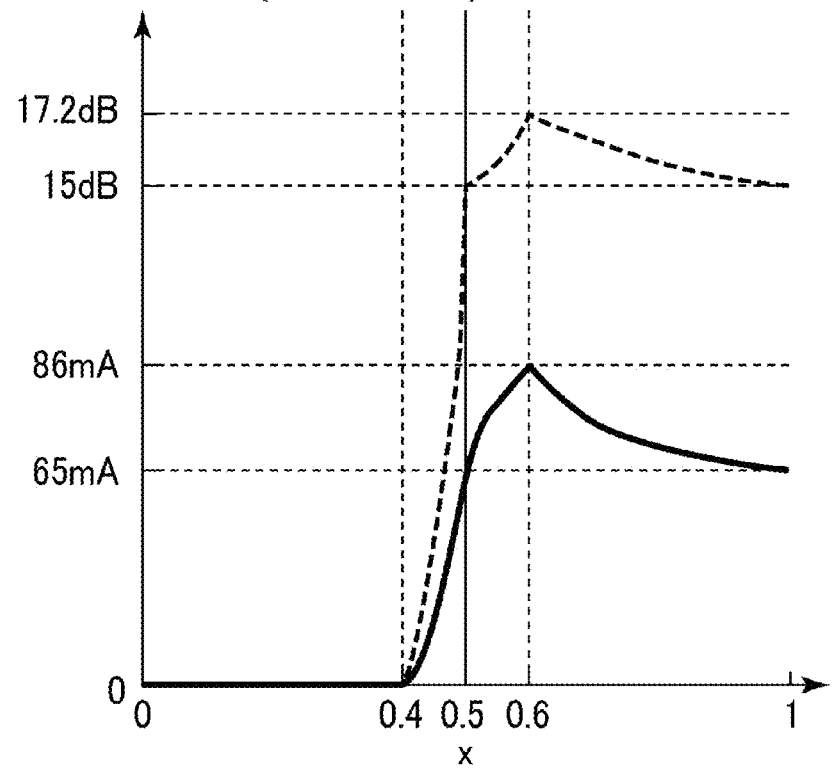

Next, in reference to FIGS. 7A and 7B, the driving method for the wavelength division multiplexing optical receiver according to Example 2 of the present invention is described, in which the configuration of the receiver is the same as that in Example 1. FIGS. 7A and 7B are graphs illustrating the driving current for the semiconductor amplifier in Example 2 of the present invention. FIG. 7A is a graph illustrating the driving current and the optical gain for the polarization dependent SOA that amplifies the P polarized wave component, and FIG. 7B is a graph illustrating the driving current and the optical gain for the polarization dependent SOA that amplifies the S polarized wave component.

In Example 2, the range of the intensity ratio x of light that drives the two polarization dependent SOAs at the same time is preset to 0.4<x<0.6, for example. In the region where either polarized wave, S polarized wave or P polarized wave, is strong (here, 0<x<0.4 or 0.6<x<1), only one polarization dependent SOA is selectively driven in the same manner as in Example 1.

As for the region of 0.4<x<0.6 where the intensity of the two polarized wave components is matched, the driving current is supplied to the two polarization dependent SOAs for both S and P. Within this region, the driving current for the polarization dependent SOA for the S polarized wave amplification or for the polarization dependent SOA for the P polarized wave amplification is 0 mA at x=0.4 or 0.6, and the driving current provides the two polarization dependent SOAs with the necessary gain Gt at x=0.5. In the regions between these values, the driving currents for the two polarization dependent SOAs are continuously adjusted so that the sum of the S polarized wave component and the P polarized wave component after amplification becomes constant so as to achieve the operation where the gain is constant. Accordingly, the driving currents are symmetrical to each other with x=0.5 along the border.

In Example 2 of the present invention, though the power consumption increases within the range of 0.4<x<0.6 as compared to that in the driving method in Example 1, it is possible to lower the power as compared to the prior art when the entire region is averaged. In addition, the sudden switching operation in the S/P polarized wave SOA that could be seen at x=0.5 in the driving method in Example 1 can be avoided in Example 2. As a result, the SOA driving current can be continuously adjusted by small increments over the entire region of the intensity ratio x, and therefore, discontinuity in the optical signal or a light surge caused by the delay in the rising or plunging of the gain (usually in the order of nsec) at the time of updating the SOA driving current can be avoided so as to achieve a stable reception operation.

EXAMPLE 3

Figure 8:
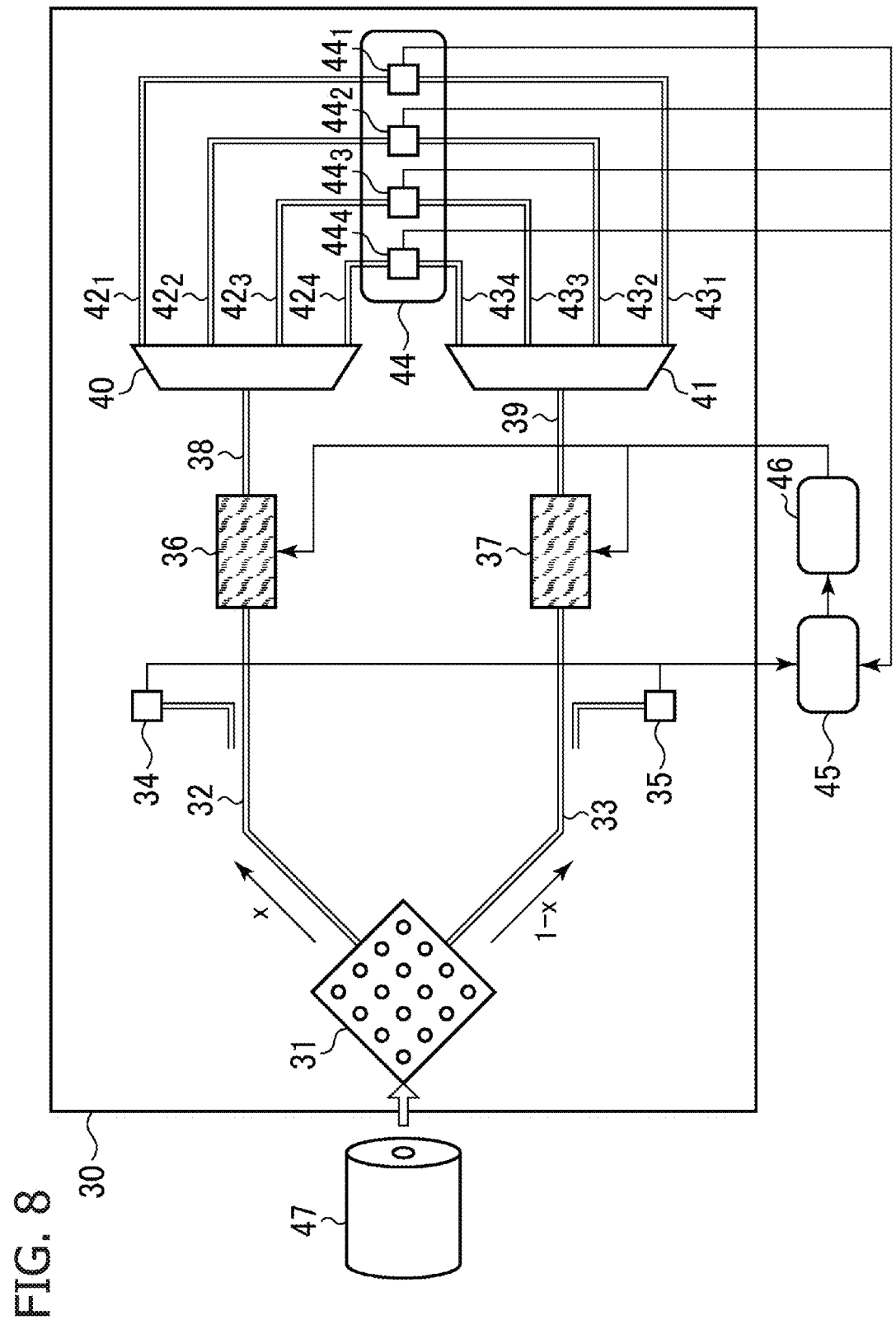
FIG. 8 is a schematic diagram illustrating the configuration of the wavelength division multiplexing optical receiver according to Example 3 of the present invention.

Next, in reference to FIG. 8, the wavelength division multiplexing optical receiver and the driving method for the same according to Example 3 of the present invention are described. FIG. 8 is a schematic diagram illustrating the configuration of the wavelength division multiplexing optical receiver according to Example 3 of the present invention, which is the same as the above-described configuration in Example 1 except that the detected outputs of the Ge photodiodes $44_1$ through $44_4$ are fed back into the control circuit 45. Here, the information on the average light intensities that have been detected by the Ge photodiodes is inputted into the control circuit 45.

In Example 3 of the present invention, the control circuit 45 first allows the monitors PD 34 and 35 along the respective P and S polarized wave paths to detect the light intensity so as to determine a SOA to operate that is located in an optical path with higher signal intensity. Subsequently, the light intensities in the respective channels ($44_1$ through $44_4$) in the Ge photodiode array 44 are acquired, and the SOA driving current is determined so that all of these values become of a predetermined light level or higher.

During this process, the relationship between the driving current and the optical gain that has been stored in the control circuit 45 in advance may be used in the same manner as in Example 1, or the results of the initial scanning of the relationship between the SOA driving current and the intensity detected by the Ge photodiode array relative to the optical input power that has been known in advance may be used. Furthermore, other algorithms may be used.

The determined SOA driving current is fed to an amplifier driving circuit 46, which updates the driving current depending on the indicated value. The above-described control procedure is carried out with a sufficient frequency for repetition (100 kHz, for example). As a result, a feedback control for the average optical power received by the Ge photodiode array is achieved, and thus, stable light amplification and reception can be achieved in the case where not only the inputted wavelength division multiplexing signal light fluctuates in the polarized wave state, but also the light intensity fluctuates timewise. Here, in the case where the fluctuation in the state of the polarization is sufficiently slow relative to the fluctuation in the light intensity, the procedures for detection by the monitors PD 34 and 35 that monitor both the P and S polarization in the feedback loop and determination of the polarization dependent SOA to be driven may be thinned so that the polarization control can be carried out with a lower frequency for repetition.

In Example 3 of the present invention, the optical receiver can have the same characteristics in terms of the power consumption, the OSNR and the like as in Example 1, even under the conditions where the fluctuations in the polarization are random relative to time.

EXAMPLE 4

Figure 9:
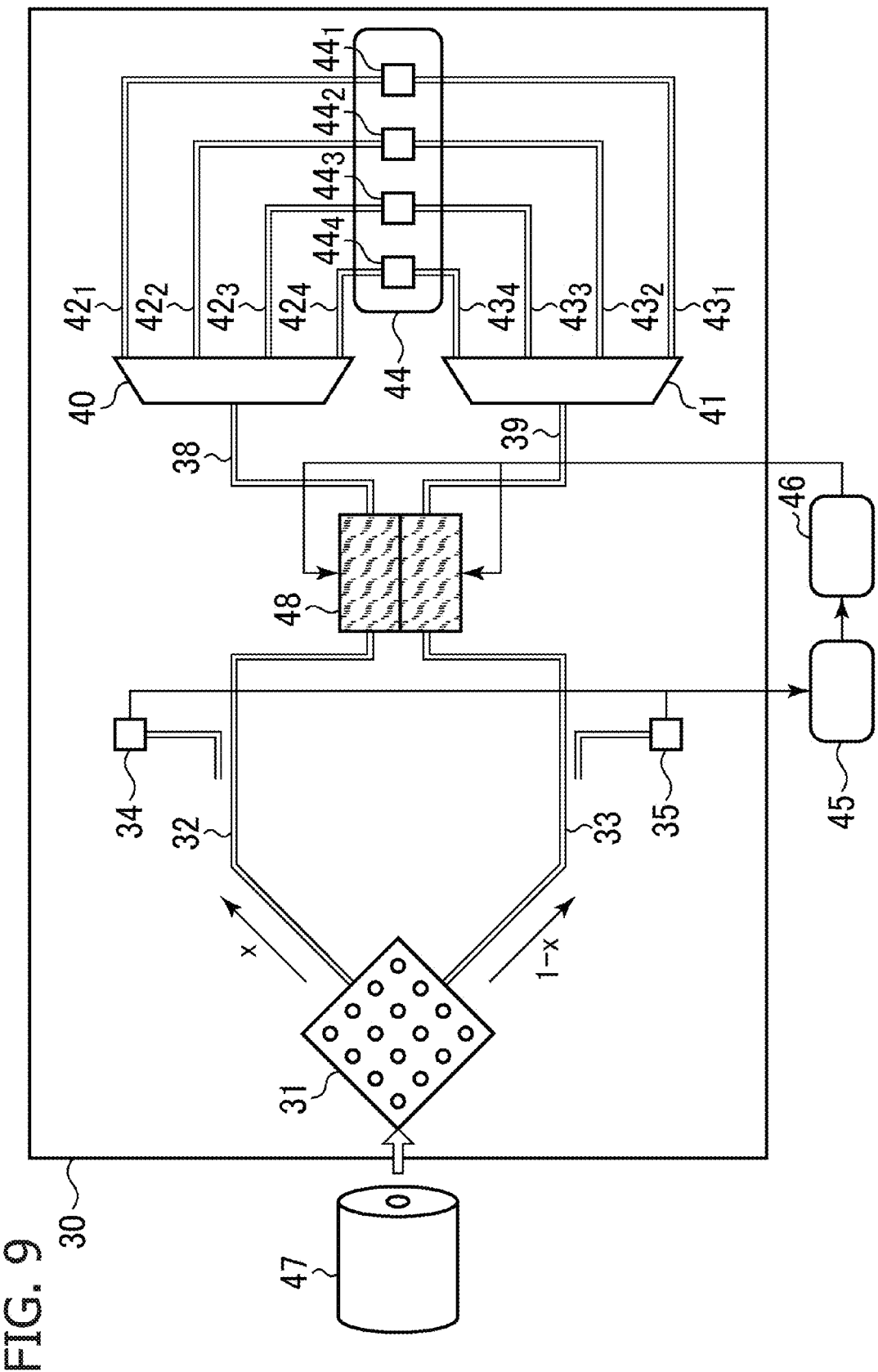
FIG. 9 is a schematic diagram illustrating the configuration of the wavelength division multiplexing optical receiver according to Example 4 of the present invention.

Next, the wavelength division multiplexing optical receiver and the driving method for the same according to Example 4 of the present invention are described in reference to FIG. 9. FIG. 9 is a schematic diagram illustrating the configuration of the wavelength division multiplexing optical receiver according to Example 4 of the present invention, which is the same as the above-described configuration in Example 1 except that a polarization dependent SOA array 48 is used instead of the two polarization dependent SOAs. The polarization dependent SOAs for the respective polarized wave paths are integrated into a single chip with Si integrated elements so as to be collectively mounted as a polarization dependent SOA array 48, and thus, the cost for the SOA chip and the recess area of the Si integrated chip can be reduced. Accordingly, an improvement in the sensitivity can be achieved with a single polarization dependent SOA chip that has approximately the same cost and size as that illustrated in Patent Literature 1 is used. Here, in the polarization dependent SOA array 48, independent electrodes are formed respectively along the two active wave-guides that are connected to the respective P and S polarized wave paths, and thus, the driving current can be adjusted individually.

In addition, the driving method for the wavelength division multiplexing optical receiver according to Example 4 of the present invention may be the same as the driving method in FIG. 5 or may be the same as the driving method in FIG. 7.

EXAMPLE 5

Figure 10:
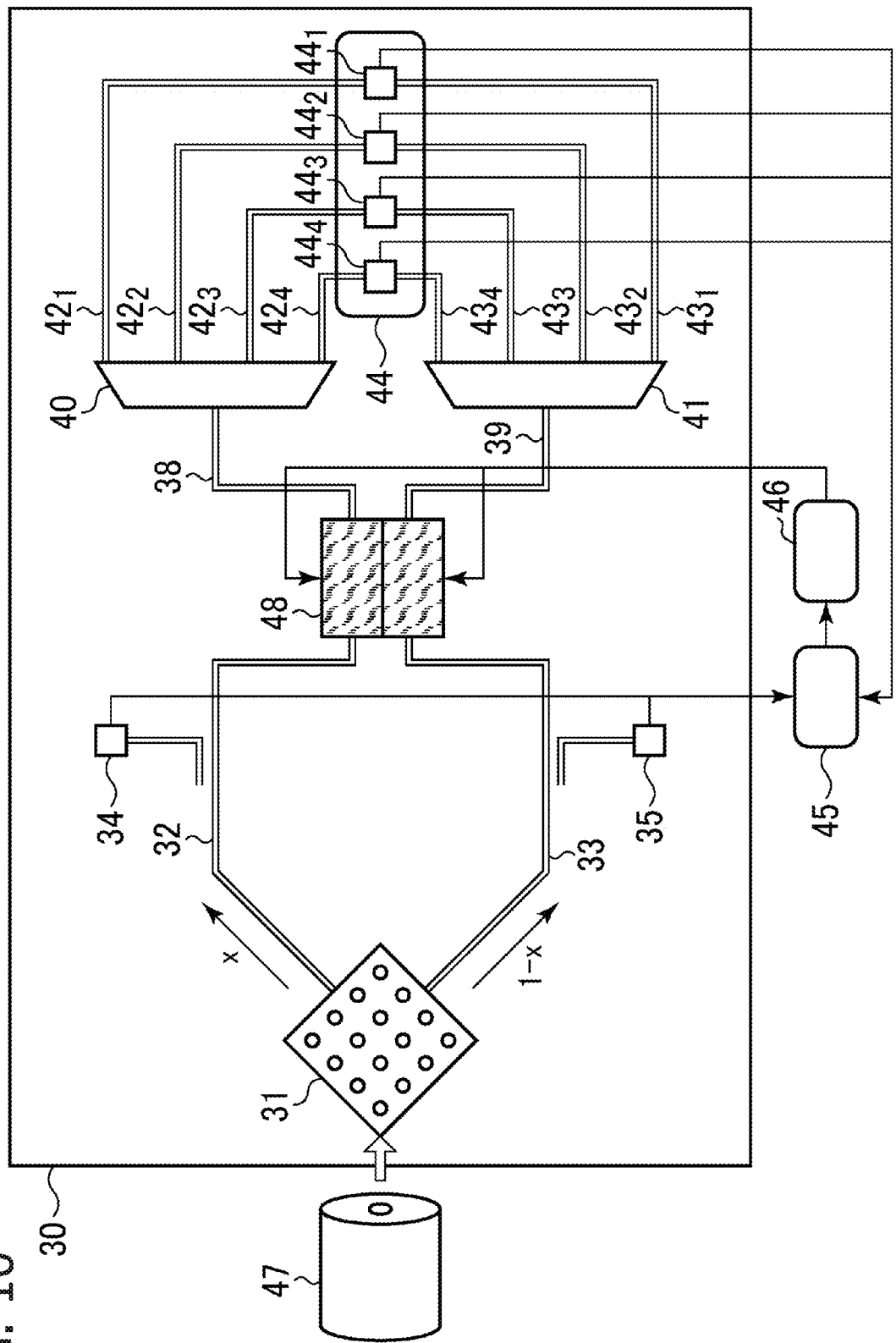
FIG. 10 is a schematic diagram illustrating the configuration of the wavelength division multiplexing optical receiver according to Example 5 of the present invention.

Next, the wavelength division multiplexing optical receiver and the driving method for the same according to Example 5 of the present invention are described in reference to FIG. 10. FIG. 10 is a schematic diagram illustrating the configuration of the wavelength division multiplexing optical receiver according to Example 5 of the present invention, which is the same as the above-described configuration in Example 4 except that the outputs detected by the Ge photodiodes $44_1$ through $44_4$ are fed back to the control circuit 45. Here, the information on the averaged light intensities detected by the Ge photodiodes is inputted into the control circuit 45.

In addition, the driving method for the wavelength division multiplexing optical receiver according to Example 5 of the present invention may be the same as the driving method in FIG. 5 or may be the same as the driving method in FIG. 7.

In Example 5 of the present invention, the cost for the SOA chip and the area of the chip having Si integrated devices can be reduced in the same manner as in Example 4, and at the same time, the optical receiver can have the same characteristics as in Example 1 even under the conditions where the polarization fluctuate randomly relative to time in the same manner as in Example 3.

EXAMPLE 6

Figure 11:
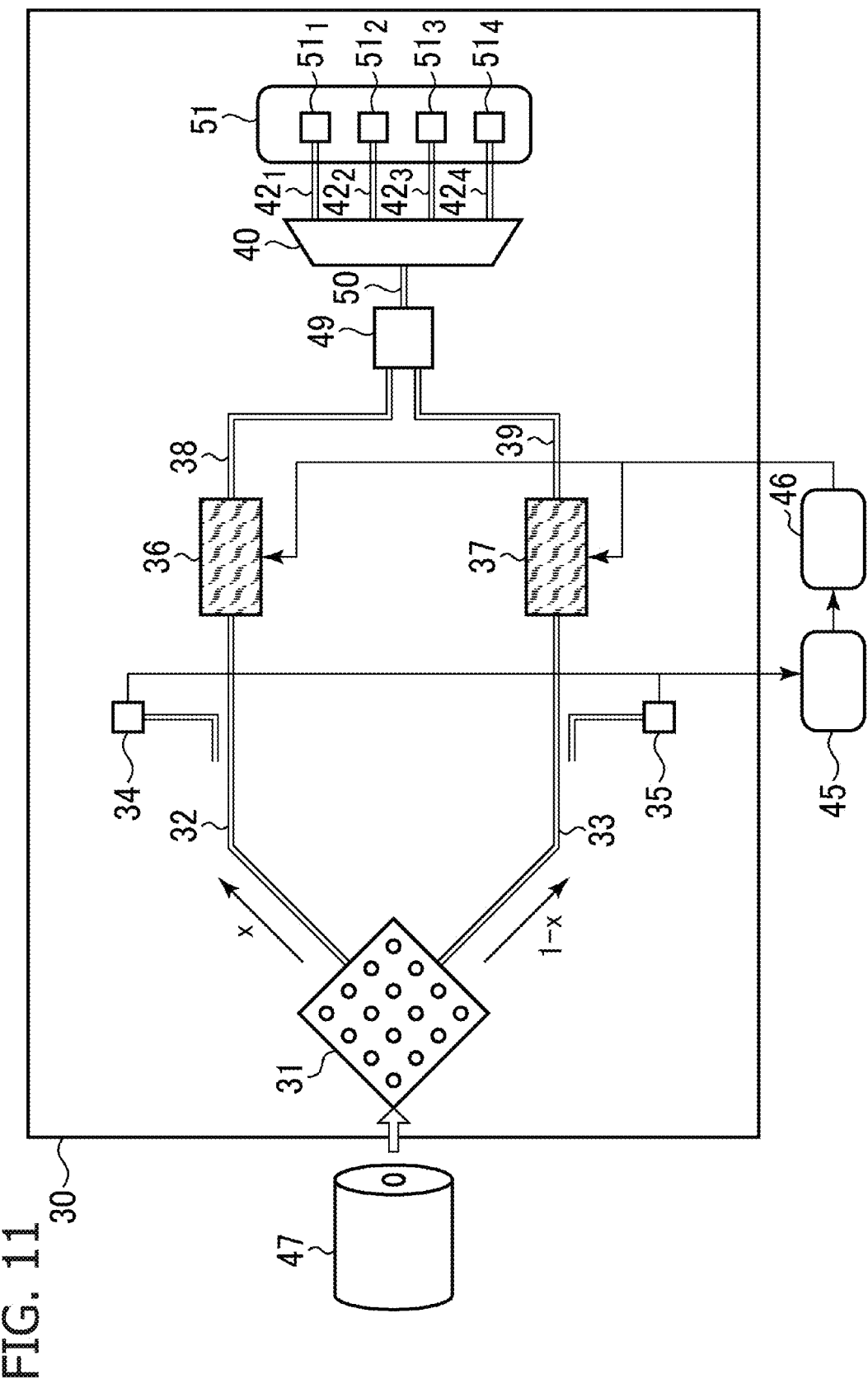
FIG. 11 is a schematic diagram illustrating the configuration of the wavelength division multiplexing optical receiver according to Example 6 of the present invention.

Next, the wavelength division multiplexing optical receiver and the driving method for the same according to Example 6 of the present invention are described in reference to FIG. 11. FIG. 11 is a schematic diagram illustrating the configuration of the wavelength division multiplexing optical receiver according to Example 6 of the present invention. In Example 6, a 2×1 MMI 49 that multiplexes the outputs of the two polarization dependent SOAs 36 and 37 is provided so that the output of the 2×1 MMI 49 is separated into the respective wavelengths by a single wavelength demultiplexer 40, and the respective wavelengths are detected by a Ge photodiode array 50.

In addition, the driving method for the wavelength division multiplexing optical receiver according to Example 6 of the present invention may be the same as the driving method in FIG. 5 or may be the same as the driving method in FIG. 7.

In Example 6 of the present invention, a 2×1 MMI is provided so that one path is used for the two polarization, and therefore, differences in the characteristics (center wavelength, filter characteristics and the like) that occurs between a pair of wavelength demultiplexers and that have been an issue in the conventional diverse configuration can be resolved. In the case where a wavelength demultiplexer that controls the wavelengths by means of a heater or the like is used, there is such an advantage that the control power thereof can be reduced to one-half. Here, the gain provided in each polarization dependent SOA 36 and 37 is set to 21 dB, which is higher than that in Example 1 by 3 dB.

EXAMPLE 7

Figure 12:
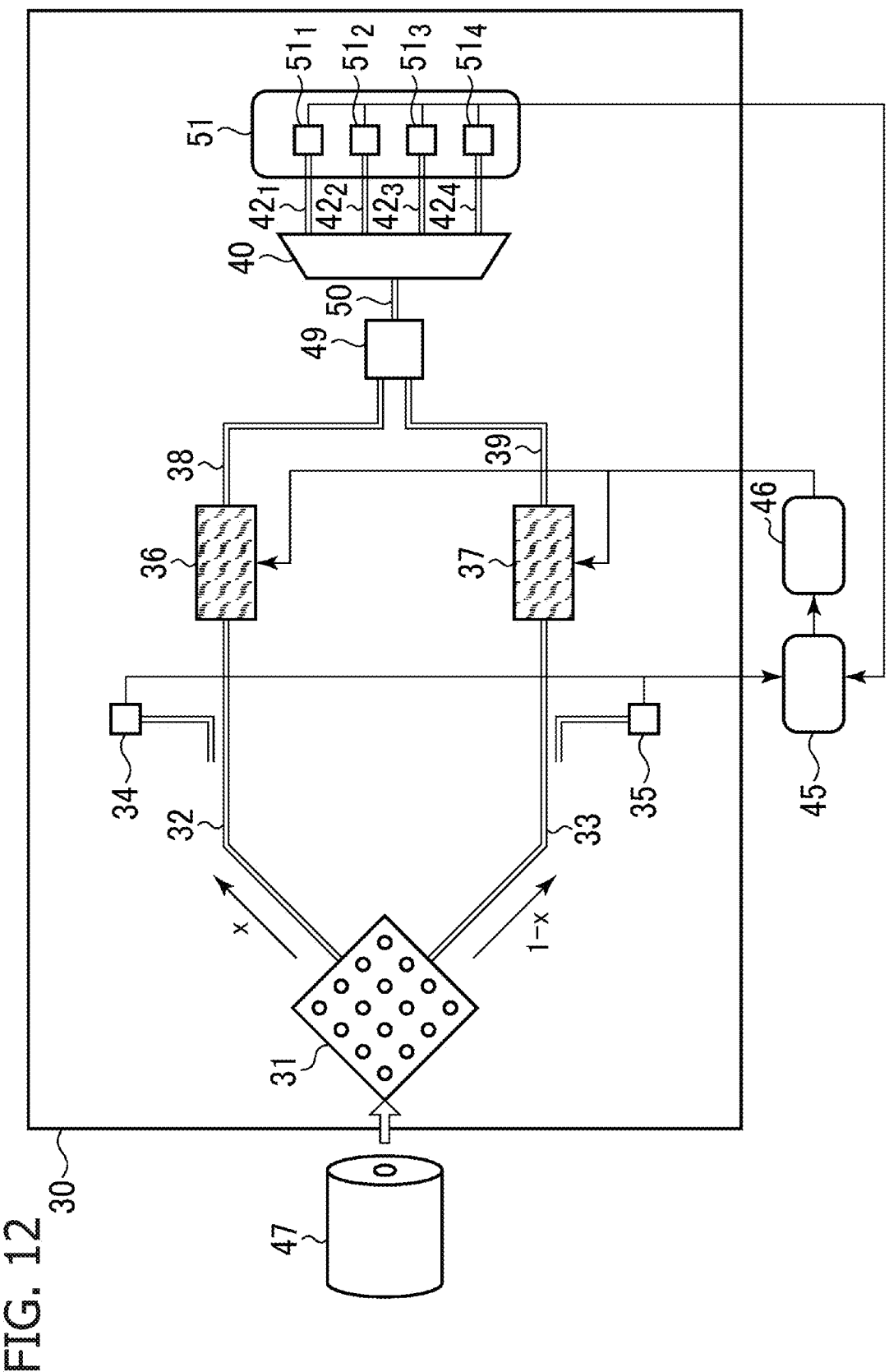
FIG. 12 is a schematic diagram illustrating the configuration of the wavelength division multiplexing optical receiver according to Example 7 of the present invention.

Next, the wavelength division multiplexing optical receiver and the driving method for the same according to Example 7 of the present invention are described in reference to FIG. 12. FIG. 12 is a schematic diagram illustrating the configuration of the wavelength division multiplexing optical receiver according to Example 7 of the present invention, which is the same as the above-described configuration in Example 6 except that the outputs detected by the Ge photodiodes $51_1$ through $51_4$ are fed back to the control circuit 45. Here, the information on the averaged light intensities detected by the Ge photodiodes is inputted into the control circuit 45.

In addition, the driving method for the wavelength division multiplexing optical receiver according to Example 7 of the present invention may be the same as the driving method in FIG. 5 or may be the same as the driving method in FIG. 7.

In the case of Example 7 as well, differences in the characteristics that are caused between a pair of wavelength demultiplexers can be resolved in the same manner as in Example 6. In the case where a wavelength demultiplexer that controls the wavelengths by means of a heater or the like is used, there is such an advantage that the control power thereof can be reduced to one-half.

EXAMPLE 8

Figure 13:
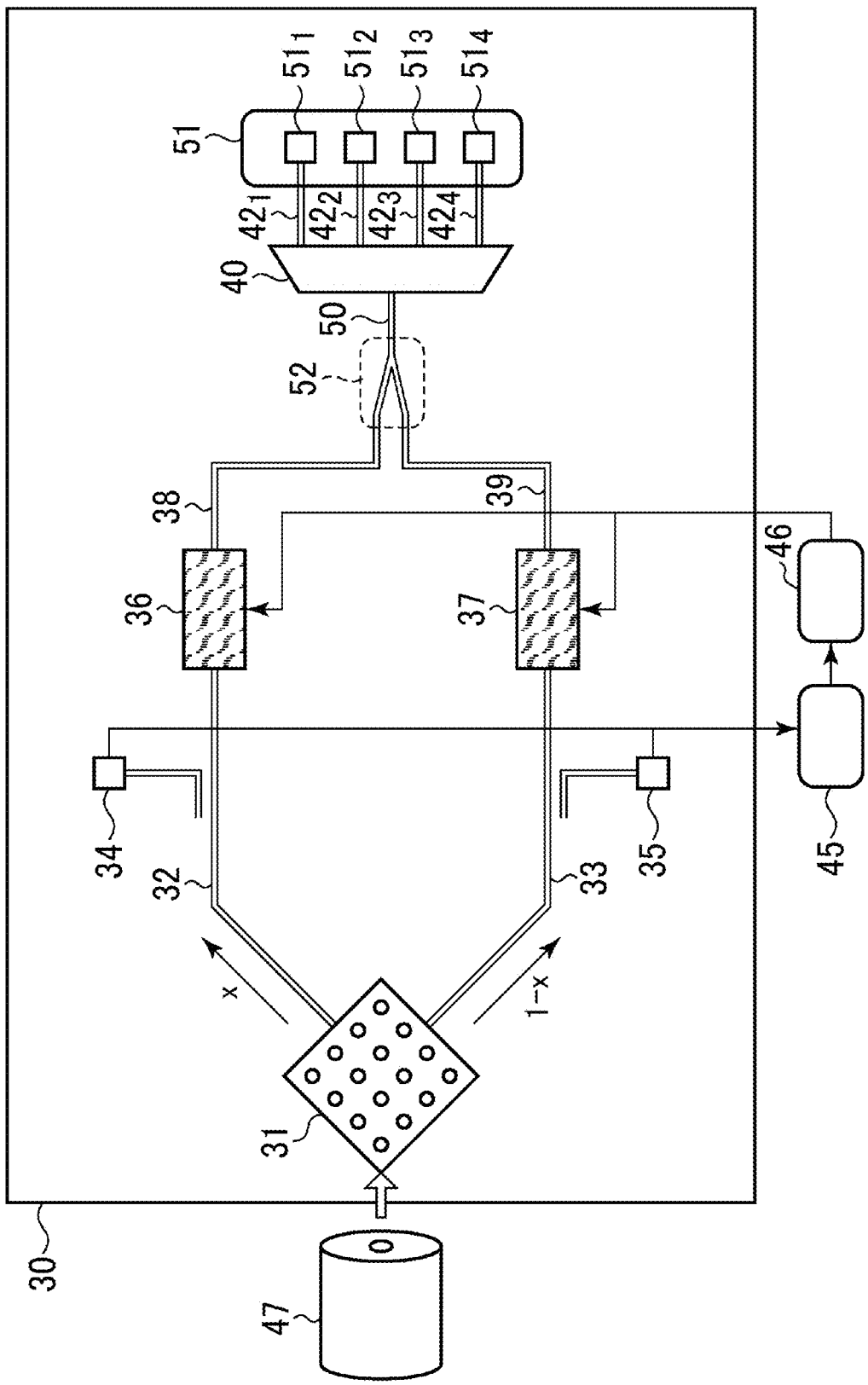
FIG. 13 is a schematic diagram illustrating the configuration of the wavelength division multiplexing optical receiver according to Example 8 of the present invention.

Next, the wavelength division multiplexing optical receiver and the driving method for the same according to Example 8 of the present invention are described in reference to FIG. 13. FIG. 13 is a schematic diagram illustrating the configuration of the wavelength division multiplexing optical receiver according to Example 8 of the present invention, which is the same as the above-described configuration in Example 6 except that a Y-branch waveguide 52 is used as an optical coupler instead of the 2×1 MMI. In Example 8, the Y-branch waveguide 52 that multiplexes the outputs from the two polarization dependent SOAs 36 and 37 is provided so that the output from the Y-branch waveguide 52 is separated into the wavelengths by the single wavelength demultiplexer 40 so that the respective wavelengths can be detected by the Ge photodiode array 50.

In addition, the driving method for the wavelength division multiplexing optical receiver according to Example 8 of the present invention may be the same as the driving method in FIG. 5 or may be the same as the driving method in FIG. 7.

In Example 8 of the present invention, one polarized wavelength path is used instead of two polarized wavelength paths by using a Y-branch waveguide, and therefore, differences in the characteristics that are caused between a pair of wavelength demultiplexers and that are an issue in the conventional diverse configuration can be resolved in the same manner as in Example 6. In the case where a wavelength demultiplexer that controls the wavelengths by means of a heater or the like is used, there is such an advantage that the control power thereof can be reduced to one-half.

EXAMPLE 9

Figure 14:
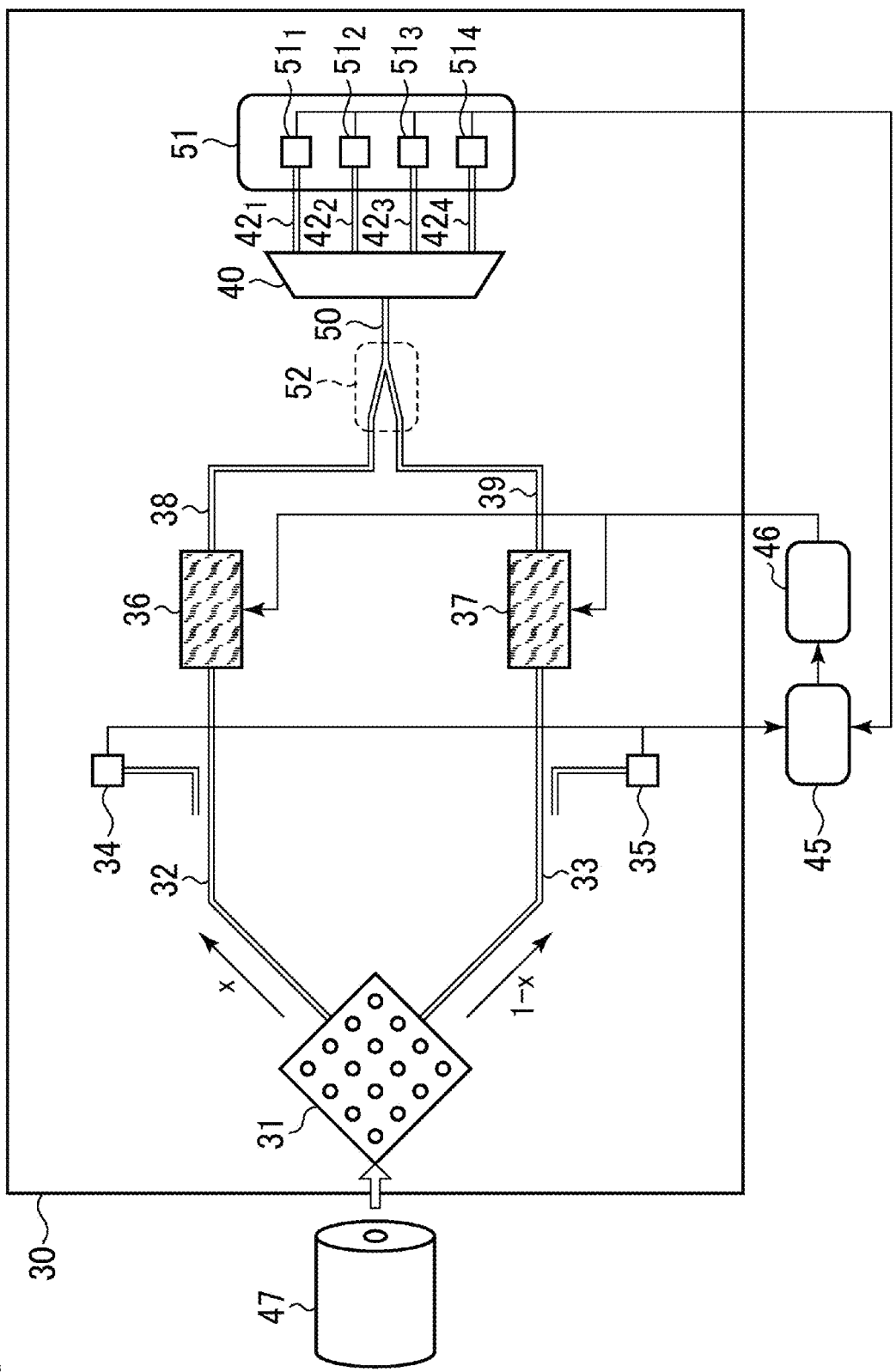
FIG. 14 is a schematic diagram illustrating the configuration of the wavelength division multiplexing optical receiver according to Example 9 of the present invention.

Next, the wavelength division multiplexing optical receiver and the driving method for the same according to Example 9 of the present invention are described in reference to FIG. 14. FIG. 14 is a schematic diagram illustrating the configuration of the wavelength division multiplexing optical receiver according to Example 9 of the present invention, which is the same as the above-described configuration in Example 8 except that the outputs detected by the Ge photodiodes $51_1$ through $51_4$ are fed back to the control circuit 45. Here as well, the information on the averaged light intensities detected by the Ge photodiodes is inputted into the control circuit 45.

In addition, the driving method for the wavelength division multiplexing optical receiver according to Example 9 of the present invention may be the same as the driving method in FIG. 5 or may be the same as the driving method in FIG. 7.

In the case of Example 9 as well, differences in the characteristics that are caused between a pair of wavelength demultiplexers can be resolved in the same manner as in Example 8. In the case where a wavelength demultiplexer that controls the wavelengths by means of a heater or the like is used, there is such an advantage that the control power thereof can be reduced to one-half.

EXAMPLE 10

Figure 15:
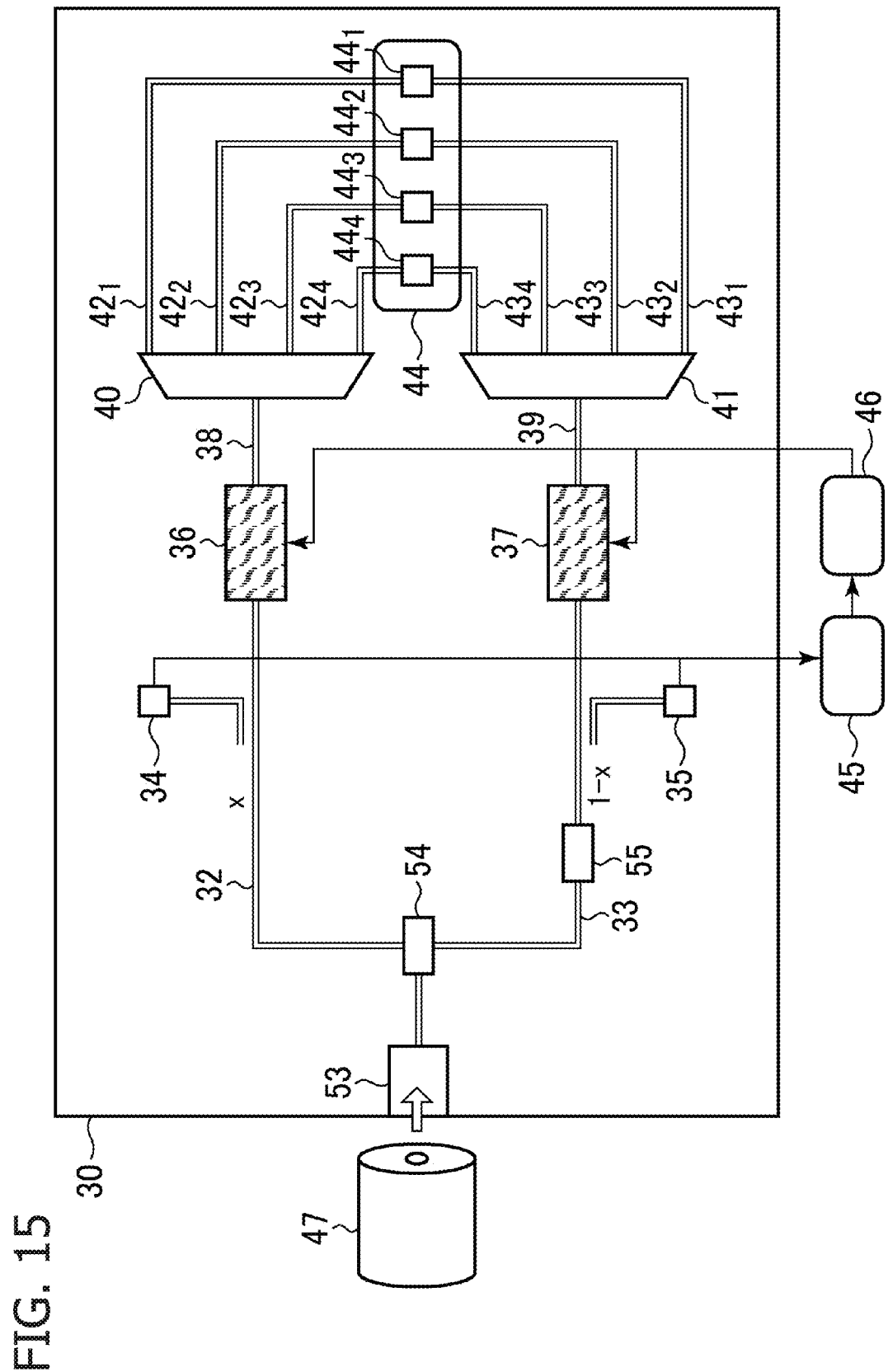
FIG. 15 is a schematic diagram illustrating the configuration of the wavelength division multiplexing optical receiver according to Example 10 of the present invention.

Next, the wavelength division multiplexing optical receiver and the driving method for the same according to Example 10 of the present invention are described in reference to FIG. 15. FIG. 15 is a schematic diagram illustrating the configuration of the wavelength division multiplexing optical receiver according to Example 10 of the present invention, which is the same as the above-described configuration in Example 1 except that the polarization splitting grating coupler is replaced by a combination of a spot size converter, a polarization beam splitter and a polarization rotator. That is to say, the wavelength multiplexing signal light that has been inputted from the optical fiber 47 into the spot size converter 53 is separated by a polarization beam splitter 54 into the S polarized light component that propagates in a TE mode and the P polarized light component that propagates in a TM mode. The separated P polarized light component that propagates in a TM mode is converted to a TE mode by a polarization rotator 55. The following operation is the same as in Example 1.

In addition, the driving method for the wavelength division multiplexing optical receiver according to Example 10 of the present invention may be the same as the driving method in FIG. 5 or may be the same as the driving method in FIG. 7.

In Example 10, only one SOA is driven, depending on the intensity ratio x of the separated S polarized wave component to the P polarized wave component in the same manner in Example 1, and therefore, it is possible to reduce the power consumption and suppress the degradation of the receiver sensitivity due to the deterioration of the OSNR. Here, Example 10 may also adopt the same configuration as in any of Examples 2 through 9 by removing the polarized wave separator type grating coupler.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A wavelength division multiplexing optical receiver, comprising:
   a polarization splitting optical coupler configured to separate wavelength division multiplexing signal light into respective polarization components;
   a first semiconductor optical amplifier configured to amplify a first polarization component that has been separated by the polarization splitting optical coupler;
   a second semiconductor optical amplifier configured to amplify a second polarization component that has been separated by the polarization splitting optical coupler;
   a wavelength demultiplexer configured to demultiplex the outputs from the first semiconductor optical amplifier and the second semiconductor optical amplifier into respective wavelengths;
   a photodetector configured to detect the outputs of the wavelength demultiplexer for the respective wavelengths;
   a first monitor photodetector configured to monitor the light intensity of the first polarization component in the front stage of the first semiconductor optical amplifier;
   a second monitor photodetector configured to monitor the light intensity of the second polarization component in the front stage of the second semiconductor optical amplifier; and
   a control circuit configured to optically amplify the first semiconductor optical amplifier and the second semiconductor optical amplifier with different optical gains in accordance with the intensity ratio of the output from the first monitor photodetector to the output of the second monitor photodetector.

2. The wavelength division multiplexing optical receiver according to claim 1, wherein
   the wavelength demultiplexer is a first wavelength demultiplexer that demultiplexes the output of the first semiconductor optical amplifier into respective wavelengths,
   the wavelength division multiplexing optical receiver further comprises a second wavelength demultiplexer that demultiplexes the output of the second semiconductor optical amplifier into respective wavelengths, and
   the photodetector is a bi-directional input type photodetector.

3. The wavelength division multiplexing optical receiver according to claim 1, further comprising:
   a multiplexer configured to multiplex the outputs from the first semiconductor optical amplifier and the second semiconductor optical amplifier into a single optical waveguide between the wavelength demultiplexer and the first semiconductor optical amplifier and the second semiconductor optical amplifier, wherein
   the wavelength demultiplexer is a single wavelength demultiplexer.

4. The wavelength division multiplexing optical receiver according to claim 3, wherein the multiplexer is either a 2×1 type wavelength division multiplexing interferometer or a Y-branch waveguide.

5. The wavelength division multiplexing optical receiver according to claim 1, wherein the first semiconductor optical amplifier and the second semiconductor optical amplifier are formed in an array on the same substrate.

6. The wavelength division multiplexing optical receiver according to claim 1, wherein the polarization splitting optical coupler is a polarization splitting grating coupler.

7. The wavelength division multiplexing optical receiver according to claim 1, wherein the polarization splitting optical coupler comprises:
   a spot size converter into which the wavelength division multiplexing signal light is inputted;
   a polarization beam splitter configured to separate the wavelength division multiplexing signal light from the spot size converter into an S polarization component that propagates in a TE mode and a P polarization component that propagates in a TM mode; and
   a polarization rotator configured to convert the P polarization component that has been separated by the polarization beam splitter and that propagates in a TM mode into a TE mode.

8. The wavelength division multiplexing optical receiver according to claim 1, wherein the control circuit controls the driving current that is injected into the first semiconductor optical amplifier and the second semiconductor optical amplifier so that the intensity of light received by the photodetector is constant by using the outputs detected by the photodetector for detecting the outputs of the wavelength demultiplexer for respective wavelengths.

9. A driving method for a wavelength division multiplexing optical receiver, comprising:
   comparing a first monitor output resulting from the monitoring of the light intensity of a first polarization component separated by a polarization splitting optical coupler configured to separate wavelength division multiplexing signal light into the respective polarization components to a second monitor output resulting from the monitoring of a second polarization component separated by the polarization splitting optical coupler,
   driving a first semiconductor optical amplifier configured to amplify the first polarization component and a second semiconductor optical amplifier configured to amplify the second polarization component by different optical gains each other in response to the intensity ratio of the first monitor output to the second monitor output,
   separating the optically amplified wavelength division multiplexing signal light into the respective wavelengths; and detecting the optically amplified wavelength division multiplexing signal light into the respective wavelengths by photodetectors.

10. The driving method for the wavelength division multiplexing optical receiver according to claim 9,
    wherein providing a optical gain by injecting a current into only one of the first semiconductor optical amplifier or the second semiconductor optical amplifier in response to the intensity ratio of the first monitor output to the second monitor output.

11. The driving method for the wavelength division multiplexing optical receiver according to claim 9,
    wherein driving the first semiconductor optical amplifier and the second semiconductor optical amplifier at the same time in the case where the intensity ratio of the first monitor output to the second monitor output is within a preset range, and driving only one of the first semiconductor optical amplifier and the second semiconductor optical amplifier in the case where the intensity ratio of the first monitor output to the second monitor output is out of the preset range.

12. The driving method for the wavelength division multiplexing optical receiver according to claim 9,
  wherein controlling the driving current being injected into the first semiconductor optical amplifier and the second semiconductor optical amplifier in such a manner that the light gain provided before being inputted into the photodetector after wavelength separation is constant irrelevant of the polarization state of the wavelength division multiplexing signal light.

13. The driving method for the wavelength division multiplexing optical receiver according to claim 9,
  wherein controlling the driving current being injected into the first semiconductor optical amplifier and the second semiconductor optical amplifier in such a manner that the intensity of light received by the photodetector is constant.

* * * * *